(12) United States Patent
Wells et al.

(10) Patent No.: US 11,262,516 B2
(45) Date of Patent: Mar. 1, 2022

(54) HIGH DENSITY OPTICAL CABLES

(71) Applicant: Prysmian S.p.A., Milan (IT)

(72) Inventors: Ben H. Wells, Columbia, SC (US); Ehsan Fallahmohammadi, Lexington, SC (US); Brian G. Risch, Granite Falls, NC (US); Clint Nicholaus Anderson, Lexington, SC (US); John R. Sach, Lexington, SC (US); Jeffrey Scott Barker, Claremont, NC (US)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/213,491

(22) Filed: Dec. 7, 2018

(65) Prior Publication Data

US 2020/0026015 A1 Jan. 23, 2020

Related U.S. Application Data

(63) Continuation-in-part of application No. 16/028,264, filed on Jul. 5, 2018, now abandoned.

(51) Int. Cl.
*G02B 6/44* (2006.01)
(52) U.S. Cl.
CPC .......... *G02B 6/4434* (2013.01); *G02B 6/443* (2013.01)
(58) Field of Classification Search
None
See application file for complete search history.

(56) References Cited

U.S. PATENT DOCUMENTS

| 4,515,435 | A | | 5/1985 | Anderson | |
|---|---|---|---|---|---|
| 4,645,298 | A | * | 2/1987 | Gartside, III | ........ G02B 6/4401 385/103 |
| 4,898,451 | A | | 2/1990 | Story | |
| 5,345,526 | A | | 9/1994 | Blew | |
| 5,390,273 | A | * | 2/1995 | Rahman | ............... G02B 6/4403 385/112 |
| 5,682,454 | A | | 10/1997 | Gaillard | |
| 5,703,984 | A | * | 12/1997 | Carratt | ............... G02B 6/02009 385/102 |
| 5,720,908 | A | | 2/1998 | Gaillard | |
| 5,751,880 | A | | 5/1998 | Gaillard | |

(Continued)

FOREIGN PATENT DOCUMENTS

| CL | 201402657 | 10/2014 |
|---|---|---|
| CL | 59407 | 12/2016 |

(Continued)

OTHER PUBLICATIONS

DSM, "Cablelite® 9D9-287," Product Data, DSM Desotech, www.dsmdesotech.com, Mar. 2007, 2 pages.

(Continued)

*Primary Examiner* — Chris H Chu
(74) *Attorney, Agent, or Firm* — Slater Matsil, LLP

(57) ABSTRACT

An optical cable includes a plurality of deformable buffer tubes and an outer jacket surrounding the plurality of deformable buffer tubes. Each deformable buffer tube of the plurality of deformable buffer tubes includes a single flexible ribbon including a plurality of optical fibers. Each deformable buffer tube further includes an axial cross-section of the deformable buffer tube that includes the single flexible ribbon. The axial cross-section comprises an irregular shape.

28 Claims, 25 Drawing Sheets

(56) References Cited

U.S. PATENT DOCUMENTS

| | | | | |
|---|---|---|---|---|
| 5,982,965 | A * | 11/1999 | Cheron | G02B 6/4433 385/100 |
| 6,480,653 | B1 * | 11/2002 | Hulin | G02B 6/4413 385/100 |
| 6,937,802 | B2 | 8/2005 | Jamet et al. | |
| 7,346,244 | B2 | 3/2008 | Gowan et al. | |
| 9,086,555 | B2 | 7/2015 | Namazue et al. | |
| 9,389,386 | B2 | 7/2016 | Matsuzawa et al. | |
| 10,379,310 | B2 | 8/2019 | Aznag et al. | |
| 2003/0068146 | A1 | 4/2003 | Nechitailo et al. | |
| 2003/0086665 | A1 * | 5/2003 | Nechitailo | G02B 6/4407 385/110 |
| 2003/0118301 | A1 | 6/2003 | Hurley et al. | |
| 2004/0118301 | A1 | 6/2004 | Yalniz | |
| 2004/0120665 | A1 * | 6/2004 | Hurley | G02B 6/441 385/106 |
| 2004/0190842 | A1 | 9/2004 | Rhoney et al. | |
| 2005/0196113 | A1 * | 9/2005 | Hurley | G02B 6/441 385/109 |
| 2011/0110635 | A1 * | 5/2011 | Toge | G02B 6/441 385/102 |
| 2014/0016905 | A1 * | 1/2014 | Tanabe | G02B 6/4403 385/114 |
| 2014/0219621 | A1 | 8/2014 | Barnette, Jr. et al. | |
| 2017/0235068 | A1 | 8/2017 | Debban et al. | |
| 2017/0285285 | A1 * | 10/2017 | Hoshino | G02B 6/44 |
| 2018/0031792 | A1 | 2/2018 | Risch et al. | |

FOREIGN PATENT DOCUMENTS

| | | | |
|---|---|---|---|
| EP | 1065545 | A1 | 1/2001 |
| FR | 2693560 | A1 | 1/1994 |
| JP | 2010044336 | A | 2/2010 |
| JP | 2012103341 | A | 5/2012 |
| WO | 2012023508 | A1 | 2/2012 |
| WO | 2012165371 | A1 | 12/2012 |
| WO | 2013165407 | A1 | 11/2013 |
| WO | 2017131117 | A1 | 8/2017 |
| WO | 2018022031 | A1 | 2/2018 |

OTHER PUBLICATIONS

DSM, "Cablelite® 9D9-464," Dec. 2012, 1 page.
Cablelite Optical Fiber Inks, "Cablelite® 9D9-518," Product Data, DSM Desotech, Feb. 2012, 3 pages.
Henkel Technologies, Loctite, "Loctite® 3341," Technical Data Sheet, Oct. 2005, 4 pages.
Henkel, Loctite, "Loctite® SI 5240," Technical Data Sheet, Jan. 2015, 4 pages.

* cited by examiner

|  | Solid Polypropylene Upjacket | Solid Polypropylene Upjacket | Foamed Polypropylene Upjacket | Foamed Polypropylene Upjacket | Foamed Polypropylene Upjacket | D. Mat. Upjacket |
|---|---|---|---|---|---|---|
| Upjacket Diameter (mm) | 6.4 | 8.3 | 6.3 | 6.3 | 8.3 | 7.4 |
| S. M. Diameter (mm) | 3.30 | 3.50 | 3.30 | 3.30 | 3.50 | 3.60 |
| Foam (%) | 0 | 0 | 45 | 35 | 40 | 0 |
| Compressive Modulus (lbf/in) | 39 400 ±1 400 | 41 800 ±1 100 | 20 400 ±1 100 | 21 200 ±900 | 22 600 ±1 000 | 15 600 ±600 |

Fig. 5D

| Compressive Modulus (lbf/in) | Undeformed Buffer Tube | Deformed Buffer Tube | D. Mat. Upjacket |
|---|---|---|---|
| | 650 ± 10 | 860 ± 40 | 15 600 ± 600 |

Fig. 5E

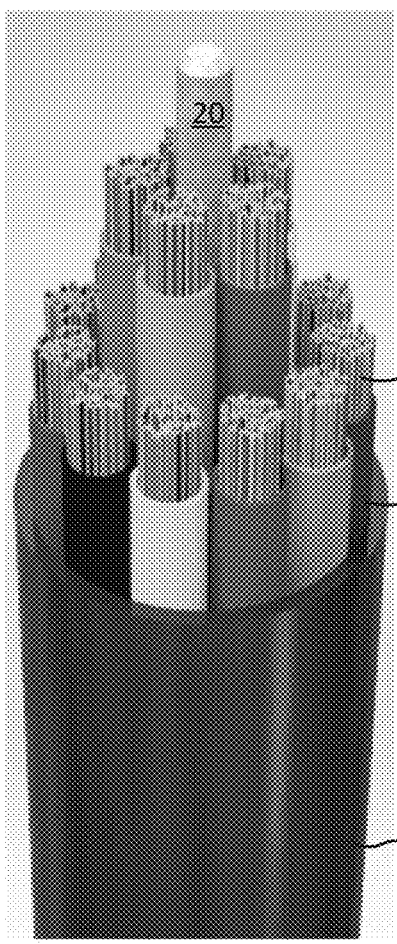 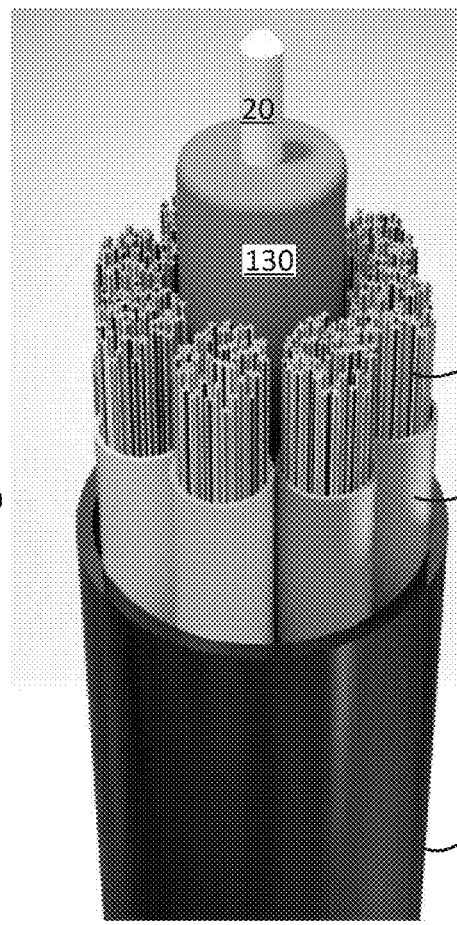
*Fig. 7B*  *Fig. 8B*

| Product | Cable diameter (mm) | Duct size (in) | Total number of buffer tubes | Number of rows of buffer tubes | Number of buffer tubes in first row | Jacket around central strength member | Number of fibers per buffer tube | Diameter of fiber (μm) | Number of additional strength member | Fill % | Total number of fibers | Number of fibers per unit area |
|---|---|---|---|---|---|---|---|---|---|---|---|---|
| 1 | 34.7 | 2 | 18 | 2 | 6 | Y | 288 | 200 | 0 | 68 | 5184 | 5.5 |
| 2 | 37.4 | 2 | 16 | 2 | 5 | n | 432 | 200 | 0 | 74 | 6912 | 6.3 |
| 3 | 38.8 | 2 | 8 | 1 | 8 | Y | 864 | 200 | 0 | 76 | 6912 | 5.8 |
| 4 | 39.4 | 2 | 12 | 2 | 3 | N | 576 | 200 | 3 | 78 | 6912 | 5.7 |
| 5 | 40.5 | 2 | 24 | 2 | 9 | Y | 288 | 200 | 0 | 80 | 6912 | 5.4 |
| 6 | 24.7 | 1.25 | 6 | 1 | 6 | Y | 288 | 250 | 0 | 78 | 1728 | 3.6 |

*Fig. 13A*

| Product | Cable diameter (mm) | Duct size (in) | Total number of buffer tubes | Number of rows of buffer tubes | Number of buffer tubes in first row | Jacket around central strength member | Number of fibers per buffer tube | Diameter of fiber (μm) | Number of additional strength member | Fill % | Total number of fibers | Number of fibers per unit area |
|---|---|---|---|---|---|---|---|---|---|---|---|---|
| 7 | 26.8 | 1.5 | 4 | 1 | 4 | N | 864 | 200 | 4 | 70 | 3456 | 6.1 |
| 8 | 28.2 | 1.5 | 16 | 2 | 5 | N | 216 | 200 | 0 | 74 | 3456 | 5.5 |
| 9 | 28.2 | 1.5 | 6 | 1 | 6 | Y | 576 | 200 | 0 | 74 | 3456 | 5.5 |
| 10 | 28.3 | 1.5 | 24 | 2 | 9 | Y | 144 | 200 | 0 | 74 | 3456 | 5.5 |
| 11 | 29.4 | 1.5 | 8 | 1 | 8 | Y | 432 | 200 | 0 | 77 | 3456 | 5.1 |
| 12 | 30.4 | 1.5 | 12 | 2 | 3 | N | 288 | 200 | 3 | 80 | 3456 | 4.8 |

Fig. 13B

HIGH DENSITY OPTICAL CABLES

CROSS-REFERENCE TO RELATED APPLICATIONS

This application is a continuation in-part of U.S. application Ser. No. 16/028,264, filed on Jul. 5, 2018, which application is incorporated by reference in its entirety.

TECHNICAL FIELD

The present invention relates generally to optical cables, and, in particular embodiments, to high density optical cables.

BACKGROUND

Optical fibers are very small diameter glass strands capable of transmitting an optical signal over great distances, at very high speeds, and with relatively low signal loss relative to standard copper wire networks. Optical cables are therefore widely used in long distance communication and have replaced other technologies such as satellite communication, standard wire communication etc. Besides long distance communication, optical fibers are also used in many applications such as medicine, aviation, computer data servers, etc.

There is a growing need in many applications for optical cables that are able to transfer high data rates while taking minimum space. Such need can arise, for example, in data servers where space for the optical fiber is a critical limiting factor. In particular, data servers are processing increasingly higher amounts of data that require increased connectivity to the data servers. However, the maximum size of the optical cable is limited by the size of the ducts through which the cables have to be passed through. Squeezing the conventional optical cables through the ducts is not a viable option. This is because while conventional optical fibers can transmit more data than copper wires, they are also more prone to damage during installation. The performance of optical fibers within the cables is very sensitive to bending, buckling, or compressive stresses. Excessive compressive stress during manufacture, cable installation, or service can adversely affect the mechanical and optical performance of conventional optical fibers.

Alternately, changing the size of the ducts can be prohibitively expensive especially in already existing installations.

SUMMARY

In accordance with an embodiment, an optical cable includes a plurality of deformable buffer tubes and an outer jacket surrounding the plurality of deformable buffer tubes. Each deformable buffer tube of the plurality of deformable buffer tubes includes a single flexible ribbon including a plurality of optical fibers. Each deformable buffer tube further includes an axial cross-section of the deformable buffer tube that includes the single flexible ribbon. The axial cross-section comprises an irregular shape.

In accordance with another embodiment, an optical cable includes a central strength member, a plurality of buffer tubes disposed around the central strength member, and an outer jacket surrounding the plurality of buffer tubes. Each of the plurality of buffer tubes includes a buffer tube jacket surrounding a single flexible ribbon. The buffer tube jacket includes a first deformable material that is deformed plastically. Each single flexible ribbon includes a plurality of optical fibers and a first longitudinal length. For each single flexible ribbon, each optical fiber of the plurality of optical fibers is attached to an adjacent optical fiber of the plurality of optical fibers along a bond region including a second longitudinal length that is less than the first longitudinal length.

In accordance with still another embodiment, an optical cable includes a rigid strength member, a deformable upjacket surrounding the rigid strength member, a plurality of buffer tubes disposed around the rigid strength member, and an outer jacket surrounding the plurality of buffer tubes. Each of the plurality of buffer tubes includes a single ribbon including a plurality of optical fibers. Each of the plurality of buffer tubes, including each corresponding ribbon, includes a first compressive modulus. The rigid strength member with the deformable upjacket includes a second compressive modulus. A ratio of the first compressive modulus to the second compressive modulus is about 1:1 to 1:20.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A-2E illustrates an optical cable in accordance with an embodiment of the present invention, wherein FIG. 2A illustrates a cross-sectional view of the optical cable, wherein FIG. 2B illustrates projection view of an array of optical fibers, wherein FIG. 2C illustrates a corresponding cross-sectional area of the array of optical fibers illustrated in FIG. 2B, wherein FIG. 2D illustrates a flexible ribbon formed using the array of optical fibers, and wherein FIG. 2E illustrates a deformable buffer tube formed using a plurality of flexible ribbons;

FIG. 5D illustrates a table summarizing results after compression testing the central strength member;

FIG. 5E illustrates a table comparing the compression test results from testing the central strength member to the buffer tube;

FIGS. 6A-6C illustrate an example embodiment of an optical cable, wherein FIG. 6A illustrates a cross-sectional design view of the optical cable prior to compression and FIG. 6B illustrates a corresponding projection view, and wherein FIG. 6C illustrates a cross-sectional view of the optical cable after compression;

FIGS. 7A-7B illustrates a specific design for an optical cable in accordance with an alternative embodiment of the invention, wherein FIG. 7A illustrates a cross-sectional view of the optical cable prior to compression and FIG. 7B illustrates a corresponding projection view;

FIGS. 8A-8B illustrates a specific design for an optical cable in accordance with an alternative embodiment of the invention, wherein FIG. 8A illustrates a cross-sectional view of the optical cable prior to compression and FIG. 8B illustrates a corresponding projection view;

FIGS. 9A-9B illustrates a specific design for an optical cable in accordance with an alternative embodiment of the invention, wherein FIG. 9A illustrates a cross-sectional view of the optical cable prior to compression and FIG. 9B illustrates a corresponding projection view;

FIGS. 10A-10B illustrates a specific design for an optical cable in accordance with an alternative embodiment of the invention, wherein FIG. 10A illustrates a cross-sectional view of the optical cable prior to compression and FIG. 10B illustrates a corresponding projection view;

FIGS. 11A-11B illustrates a specific design for an optical cable in accordance with an alternative embodiment of the invention, wherein FIG. 11A illustrates a cross-sectional view of the optical cable prior to compression and FIG. 11B illustrates a corresponding projection view;

FIGS. 13A-13B is a table summarizing examples of different cable designs in accordance with various embodiments of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely design of optical cables having a high density of optical fibers per unit cross-sectional area.

A conventional optical cable will first be described. This is followed by a structural illustration of the design of the optical cable in one embodiment using FIGS. 2A-2E. Next, experimental results that form the basis for selecting materials used in the various embodiments of the present invention will be described using FIGS. 5A-5D. Additional structural embodiments will then be described using FIGS. 3-4, and 6-12. A table summarizing examples of some of the structural embodiments will described using FIG. 13.

Figure 1:
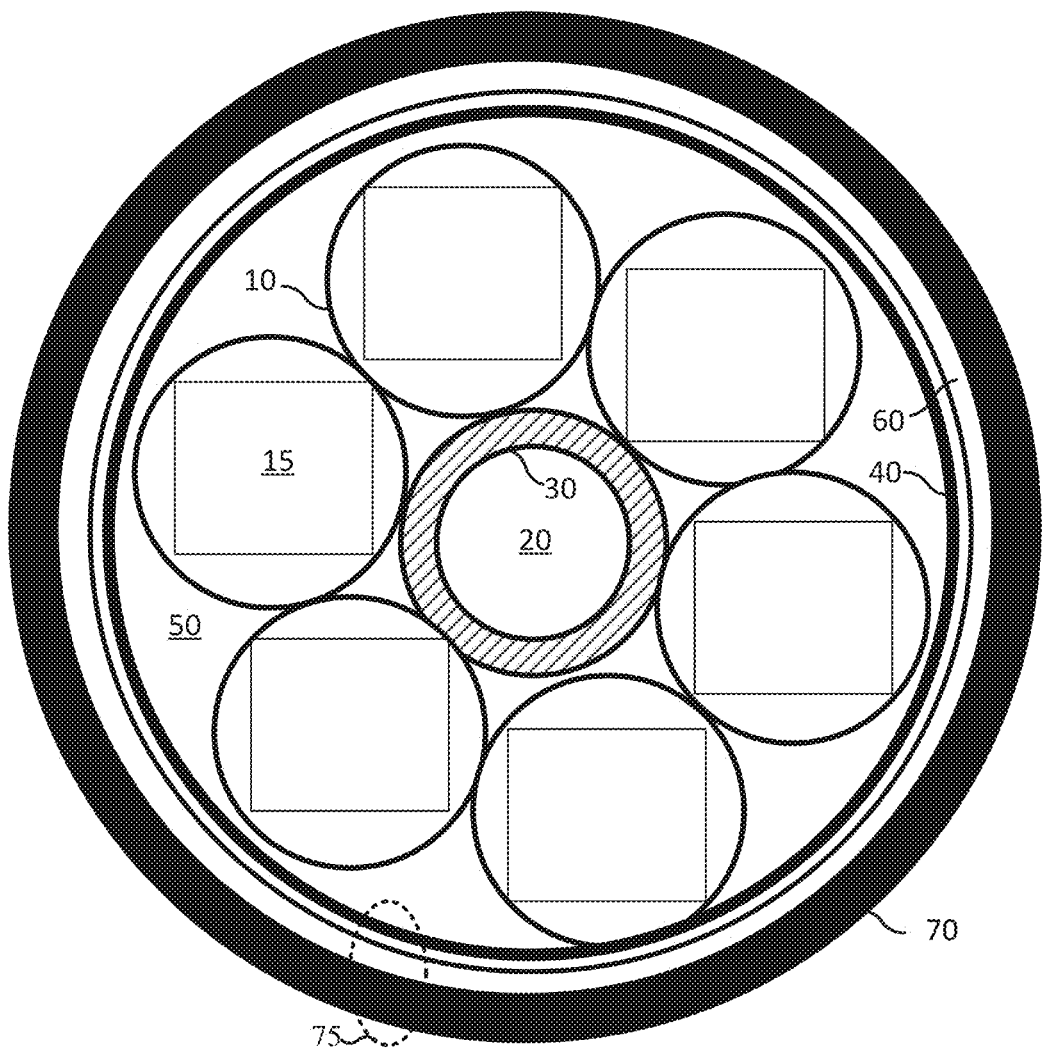
FIG. 1 illustrates a conventional optical cable.

FIG. 1 illustrates a conventional optical cable.

The conventional optical cable includes a rigid central strength member 20 as illustrated in FIG. 1. A conventional upjacket 30 surrounds the central strength member 20. The outer cover 75 of the optical cable may include several layers such as a water blocking layer 40, and an optional outer strength member 60 that may include a steel armor, and an outer jacket 70.

The optical cable further includes conventional buffer tubes 10 that contain multiple ribbons 15 of optical fibers. Conventional encapsulated ribbons 15 are then stacked and arranged into a round shaped conventional buffer tube 10.

The inventors of the present application have found that there is a significant amount of voids or interstices within each of the conventional buffer tubes 10. This is because the round shape of the conventional buffer tubes 10 is different from the square shape of the ribbons 15. Further, the conventional buffer tubes 10 are rigid and always maintain a round shape. On the other hand, the ribbons 15 are rigid and rectilinear in shape. In addition, the standard ribbon 15 has a preferential longitudinal bending axis which prevents the ribbon from folding in any other axis which prohibits a high filling ratio for conventional buffer tubes. Consequently, a significant fraction of the buffer tube area is filled with voids that could otherwise be used to hold optical fibers.

In addition, the inventors of the present application have also found that a significant fraction of the area within the optical cable outside of the buffer tubes 10 is unutilized because of the round shape of the conventional buffer tubes 10, which cannot be altered due to the associated stiffness and rigidity of these buffer tubes 10. As a consequence, the number of buffer tubes that can be placed within a cable is limited as round shapes intersect with other round shapes along a single line rather than a plane (two cylindrical objects intersect at a line). In other words, a large fraction of the space within the outer jacket 70 is empty because the conventional buffer tubes 10 are circular in shape leaving interstices 50 between adjacent buffer tubes or interstices 50 between the conventional buffer tubes 10 and the conventional upjacket 30.

For example in FIG. 1, when the outer diameter of the conventional upjacket 30 is substantially similar to the diameter of the conventional buffer tubes 10, the packing density is mathematically limited. In this example, when there are six conventional buffer tubes 10 surrounding a conventional upjacket 30, the minimum amount of void interstices per unit area of the optical cable is 22.22%. In other words, at least 22.22% of the optical cable will always be empty space that is left unutilized. As a consequence, the number of optical fibers that can be packed per unit cross-sectional area is limited.

On the other hand, if individual fibers were directly placed within the optical cable without the use of buffer tubes, they would have a higher packing density. However, such a design would make it much more difficult to identify the fibers individually when the total number of fibers within each cable is large, e.g., in the hundreds or thousands.

Therefore, there is a need for a fiber optic cable that provides high packing density of optical fibers while maintaining sufficient structural, thermal, and optical properties. For example, while packing more number of optical fibers, the optical cable also has to have adequate tensile strength, resistance to crushing, resistance to buckling, resistance to thermal contraction while maintaining optical connection.

Embodiments of the present invention avoid the above issues by providing deformable buffer tubes which allows the buffer tubes to be compressed or squeezed together in a tighter configuration. Embodiments of the present invention achieve this by a combination of using flexible ribbons and designing the buffer tube jacket to be deformable. Optionally, embodiments of the present invention further include a deformable upjacket material around the strength members. As the interstices between adjacent buffer tubes are filled by the deforming buffer tubes, more optical fibers are packed within the same dimension cable than possible in a conventional optical cable.

Figure 2A:
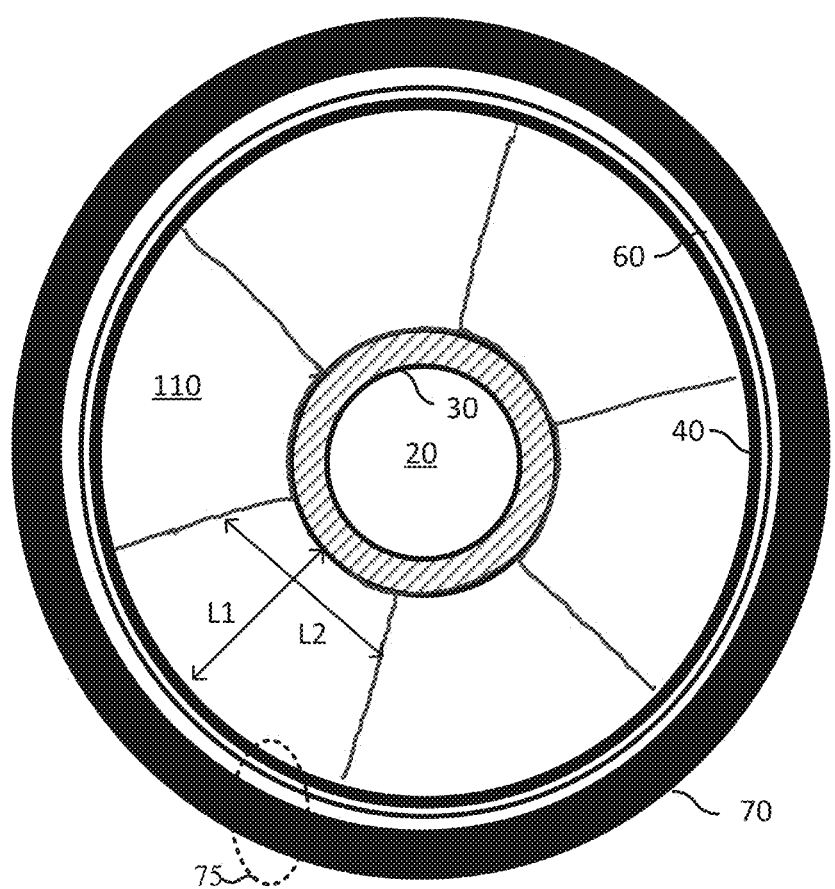
Figure 2B:
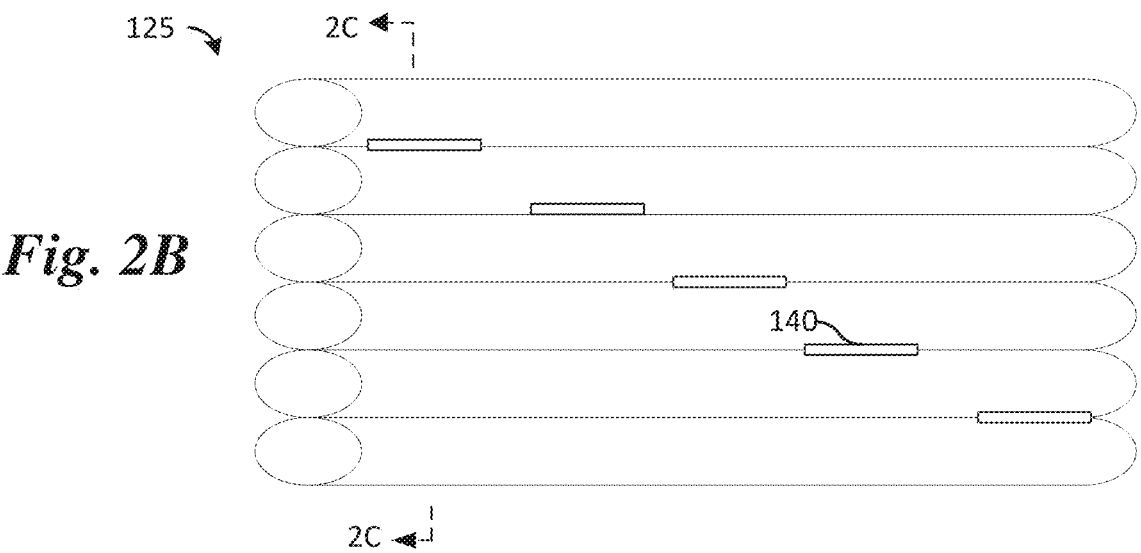
Figure 2C:
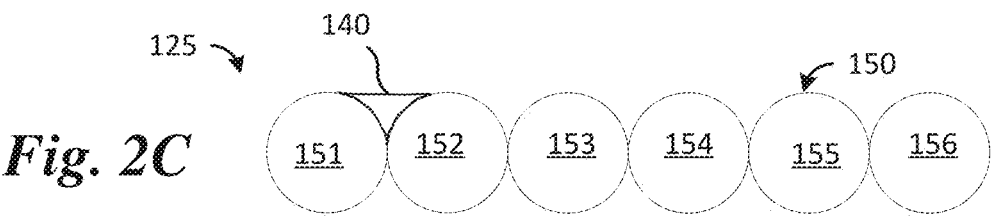
Figure 2D:
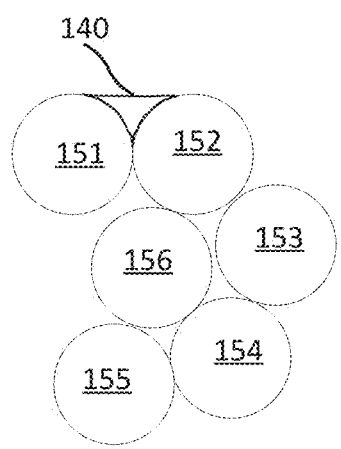
Figure 2E:
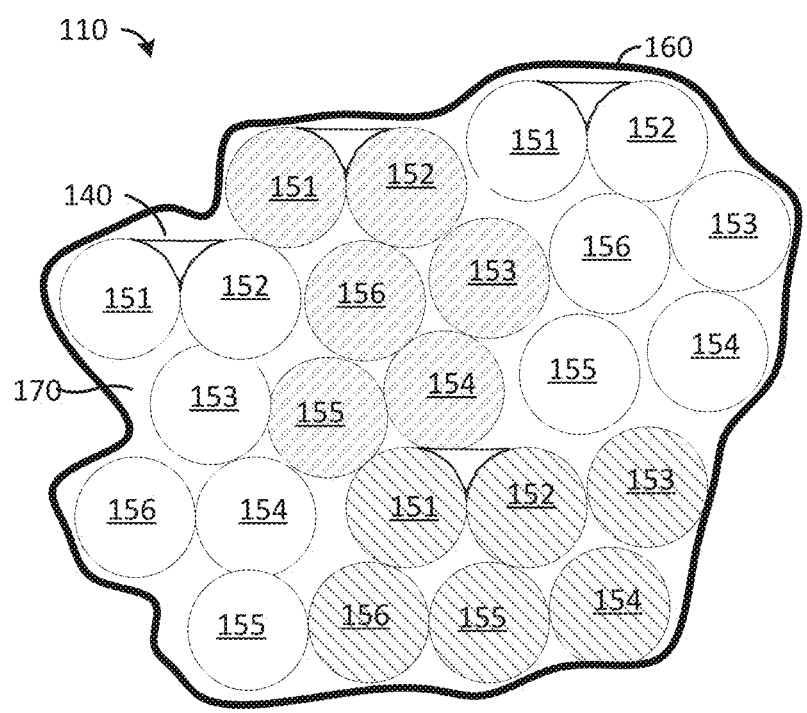

FIGS. 2A-2E illustrate an optical cable in accordance with an embodiment of the present invention, wherein FIG. 2A illustrates a cross-sectional view of the optical cable, wherein FIG. 2B illustrates projection view of an array of optical fibers, wherein FIG. 2C illustrates a corresponding cross-sectional area of the array of optical fibers illustrated in FIG. 2B, wherein FIG. 2D illustrates a flexible ribbon formed using the array of optical fibers, and wherein FIG. 2E illustrates a deformable buffer tube formed using a plurality of flexible ribbons.

Referring first to FIG. 2A, in one or more embodiments, the optical cable comprises a plurality of deformable buffer tubes no that are formed around a central region. Although six deformable buffer tubes no are shown in FIG. 2A (as well as other figures in this application), this number is not necessarily indicative of the total number of deformable buffer tubes no that will be included. FIG. 2A (as well as other figures in this application) is not necessarily indicative of the shape of the plurality of deformable buffer tubes no. In particular, although for practical reasons many of these have been illustrated as circular objects, the plurality of deformable buffer tubes no are non-circular or shaped irregularly due to deformation. For example, as illustrated in FIG. 2A, one of the plurality of deformable buffer tubes no has a first dimension along the radial direction of the optical cable and a second dimension along a direction perpendicular to this radial direction. Unlike conventional buffer tubes, where the first dimension would be equal to the second dimension, the second dimension is different (e.g., smaller or larger) than the first dimension. In particular, depending on where the dimension of the deformable buffer tubes no is measured, a different dimension may be observed unlike a conventional buffer tube that is circular. In other words, in the cross-sectional view illustrated in FIG. 2A, the deformable buffer tubes no have been deformed such that it has a non-circular cross-section.

In one or more embodiments, the central region comprises a central strength member 20 surrounded by a conventional upjacket 30. The central strength member 20 provides mechanical integrity of the cable when experiencing heavy stress. For example, during installation, the cables may be subjected to significant strain. The central strength member 20 is a rigid material and is the primary anti-buckling element in the cable. The central strength member 20 resists cable contraction at low temperatures and prevents optical fiber buckling, which would otherwise occur due to coefficient of expansion differential between optical fibers and other plastic cable components. The central strength member 20 prevents the cable from being compressed and provides a primary clamping point for hardware used to connect the cable to splice and routing enclosures.

The central strength member 20 may be made of metallic elements, glass reinforced composite rods such as glass reinforced epoxy, aramid reinforced composite rods, or composite rods made of some other high modulus, low coefficient of expansion material such as carbon fiber.

The conventional upjacket 30 may typically comprise a polymer such as polypropylene. The conventional upjacket 30 may also comprise other polymeric materials such as cellular foam polymer, e.g., cellular impact modified, nucleated polypropylene (i.e., nucleated ethylene-propylene copolymer). The upjacket helps to obtain the proper outer diameter of the strength member 20 required for the number and size of the buffer tubes to be included in the optical cable. The upjacket around the strength member 20 helps to maintain cable rigidity within a reasonable range and also lowers the cost of the cable. However, the thickness of the upjacket 30 has to be limited to avoid introducing thermal stress (e.g., as polyethylene has a much higher coefficient of thermal expansion than the central strength member 20).

As illustrated in FIG. 2A, the plurality of deformable buffer tubes no are deformed to a non-circular shape that fits within the outer cover 75. The outer cover 75 may include a number of layers such as the outer jacket 70, a water blocking layer 40, and an optional outer strength member 60. The outer jacket 70 may comprise polyurethane, polyethylene, nylon, or other suitable material. In one embodiment, the outer cover 75 includes medium-density polyethylene (MDPE), with a nominal jacket thickness of approximately 1 mm, so as to comply with the standards for fiber optic cables such as Telcordia GR-20, ICEA-640. Flame-retardant additives may also be included into the outer cover 75. The water blocking layer 40 may include water blocking threads, water blocking tapes, or other super absorbent powder type materials.

Adjacent buffer tubes of the plurality of deformable buffer tubes no physically contact with each other along a larger distance than the adjacent buffer tubes shown in FIG. 1, for example. As a consequence, the amount of voids or interstices 50 within the optical cable is significantly reduced. In the illustration of FIG. 2A, the amount of voids or interstices 50 relative to the total cross-sectional area is very small since the plurality of deformable buffer tubes no have adapted to the shape of the optical cable.

In practice, adjacent deformable buffer tubes no may adapt slightly differently based on the local stress induced by the outer jacket 75 as well as other factors such as the materials being used. However, in various embodiments, the plurality of deformable buffer tubes no has undergone plastic (or permanent) and elastic deformation during the formation of the optical cable. By undergoing plastic deformation, the plurality of deformable buffer tubes no have a low stress state (as the energy of deformation has been absorbed). Alternatively, in some embodiments, the plurality of deformable buffer tubes no are still in the elastic regime and may have undergone substantial elastic deformation.

As will described below in greater detail, in the case of a plurality of flexible ribbons 125, due to the random distribution of each of the plurality of flexible ribbons 125 in the deformable buffer tube no, a highly compact buffer tube structure can be realized. Moreover, due to the aforementioned flexibility of the plurality of flexible ribbons 125, reshaping of the deformable buffer tube no into non-circular or irregular shapes is possible.

FIGS. 2B-2E illustrate the design of the flexible ribbon and deformable buffer tubes no that enables such an adaptable design in accordance with embodiments of the present invention.

Referring to FIG. 2B, as will further described in the following figures, each buffer tube of the plurality of deformable buffer tubes no comprises a plurality of flexible ribbons 125. Each of the plurality of flexible ribbons 125 comprise a plurality of optical fibers 150 such as the first, the second, the third, the fourth, the fifth, and the sixth optical fiber 151-156. FIG. 2B is not indicative of the total number of optical fibers although only six fibers are shown.

The plurality of optical fibers 150 are arranged parallel to each other and are connected at bond regions 140. However, as illustrated in FIG. 2B, the bond regions 140 are arranged across the flexible ribbons 125 so as to selectively leave a large surface of the optical cables free of the bonding material that forms the bond region 140. Consequently, the plurality of optical fibers 150 maintain a large degree of freedom and can be effectively folded or otherwise randomly positioned when the ribbon is subjected to external stress, for example, as shown in FIG. 2D.

In various embodiments, the plurality of optical fibers 150 can be folded into a densely packed configuration as shown in FIG. 2D. In one or more embodiments, the folded optical fibers 150 may have a non-circular or irregular shape.

FIG. 2E illustrates a deformable buffer tube comprising a plurality of flexible ribbons that has been deformed during the formation of the optical cable in accordance with an embodiment of the present invention.

The flexible ribbons 125 are enclosed by a buffer tube jacket 160. In one or more embodiments, the buffer tube jacket 160 comprises polypropylene. In other embodiments, the buffer tube jacket 160 comprises cellular polypropylene, polyethylene, nylon, polyamide, polybutylene terephthalate, a polyolefin copolymer comprised of polyethylene and polypropylene, or other materials.

In addition, the flexible ribbons 125 may be dispersed within a gel 170 that allows the flexible ribbons 125 to move around relative to each other. Further, the thickness of the buffer tube jacket 160 is maintained to enable the flexibility of the ribbons. The lower thickness of the deformable buffer tubes no ensures deformation of the buffer tubes when subjected to stress. In particular, the thickness of the buffer tube jacket 160 relative to the diameter of the deformable buffer tube no is maintained within a range of 0.001 to 0.01. A typical deformable buffer tube prior to deformation has a diameter between 5 mm to 10 mm, for example, 7.4 mm.

During the formation of the optical cable, the buffer tube may be subjected to compressive stress. Buffer tubes may show increased deformation under an equivalent stress due to the temperature dependent modulus reduction during jacketing. As a consequence, the flexible ribbons 125 within the deformable buffer tube 110 may rearrange the shape/configuration to compensate or minimize this compressive stress.

As described above, in various embodiments, the optical cables include deformable buffer tubes no. However, some of the deformation of the deformable buffer tubes 110 is caused by a rearrangement of the flexible ribbons within the optical cable and as such does not result in twisting or bending of the optical fibers. Therefore, embodiments of the present invention achieve improved packing density without compromising on mechanical or optical characteristics of the optical cable.

In the conventional design described in FIG. 1 above, flat optical fiber ribbons are arranged into a rectangular stack that is twisted together to maintain its rectangular shape and to average any compressive or tensile stress on the optical fiber ribbon stack across the different optical fibers down the length of the cable. However, in the various embodiments described in the present application, it is not necessary to twist the ribbons within each deformable buffer tube 110 because there is no need to maintain the shape if the ribbons are randomly distributed in the tube.

The foldable flexible ribbons 125 are run lengthwise along each deformable buffer tube no, and each flexible ribbon 125 is allowed to take a random configuration. Subsequent twisting, if any, of the plurality of deformable buffer tubes 110 while forming the cable is sufficient to average strain across the optical fibers and meet mechanical and optical standards for the fiber optic cable.

Although, in FIG. 2E, only four flexible ribbons 125 are shown to be within the plurality of buffer tubes, in various embodiments, the plurality of deformable buffer tubes no may include a much larger or even a smaller number of flexible ribbons 125. For example, in one embodiment the plurality of deformable buffer tubes no may comprise twelve or twenty four flexible ribbons 125. In addition, each of the flexible ribbons 125 may include any suitable number of optical fibers 150. The optical fibers 150 may have a diameter in the range of 100 μm to 300 μm in various embodiments. For example, each of the flexible ribbons 125 may include twelve optical fibers in one illustration. Therefore, in this example, each of the plurality of deformable buffer tubes no includes 144 or 288 optical fibers.

Using embodiments of the present invention, the optical cable may have a fiber density of 5.0 fibers per square millimeter (fibers/mm$^2$) or greater. In one or more embodiments, the fiber density of the optical cable may be between 3.5 fibers/mm$^2$ to 10 fibers/mm$^2$, preferably between 3.5 fibers/mm$^2$ to 8 fibers/mm$^2$.

Figure 3:
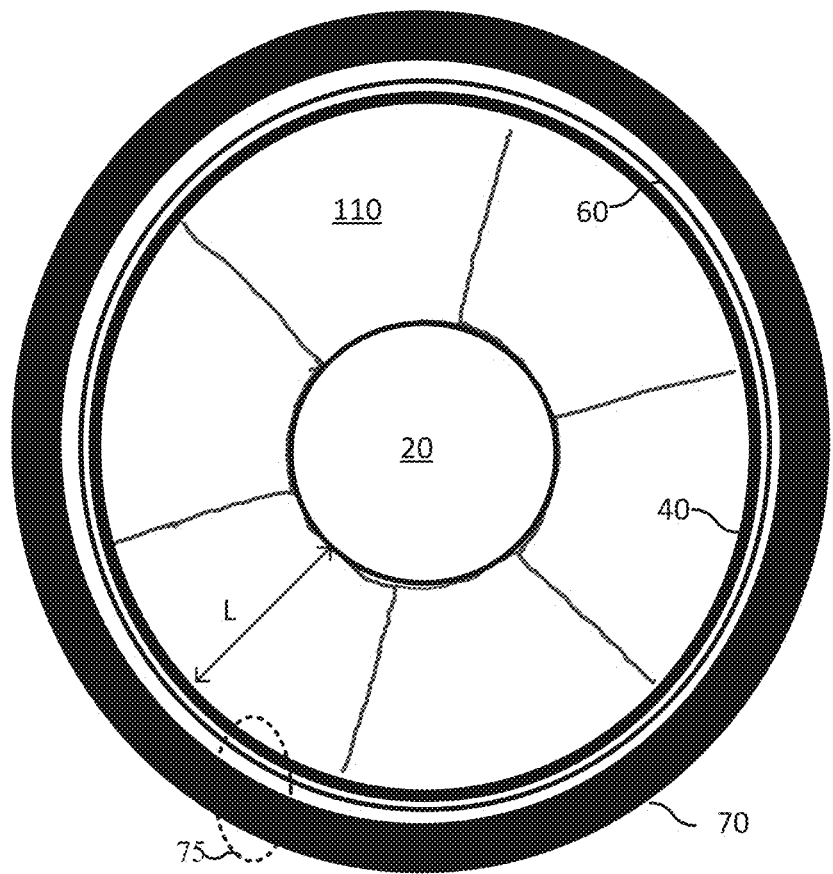
FIG. 3 illustrates a further embodiment of the present invention in which no upjacket surrounds the central strength member.

FIG. 3 illustrates a further embodiment of the present invention in which no upjacket surrounds the central strength member.

In one or more embodiments, the strength member 20 may not include an upjacket material because the deformable buffer tubes no provide sufficient packing density and relaxation of the built-in stress. Otherwise, this embodiment may be similar to the previous embodiment described in FIGS. 2A-2E.

The diameter of the strength member 20 may be similar to the dimension "L" of the deformable buffer tubes no as shown in FIG. 3 in one embodiment. In other embodiments, the diameter of the strength member 20 may be smaller than the dimension "L" of the deformable buffer tubes 110.

Figure 4A:
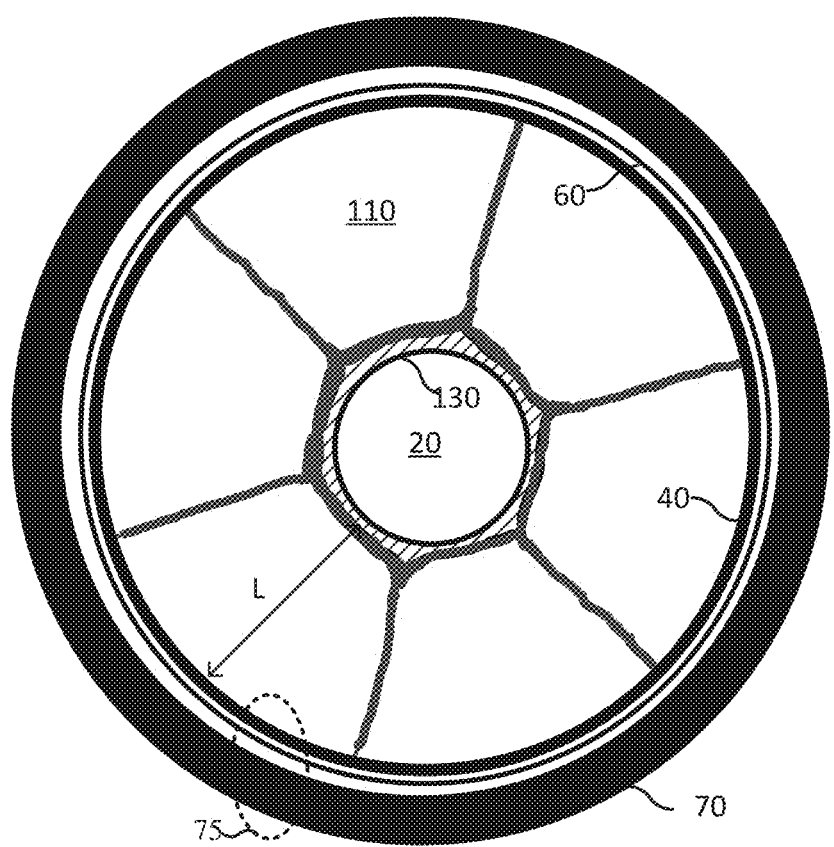
FIGS. 4A-4B illustrate further embodiments of the present invention having an additional deformable upjacket surrounding the central strength member.
Figure 4B:
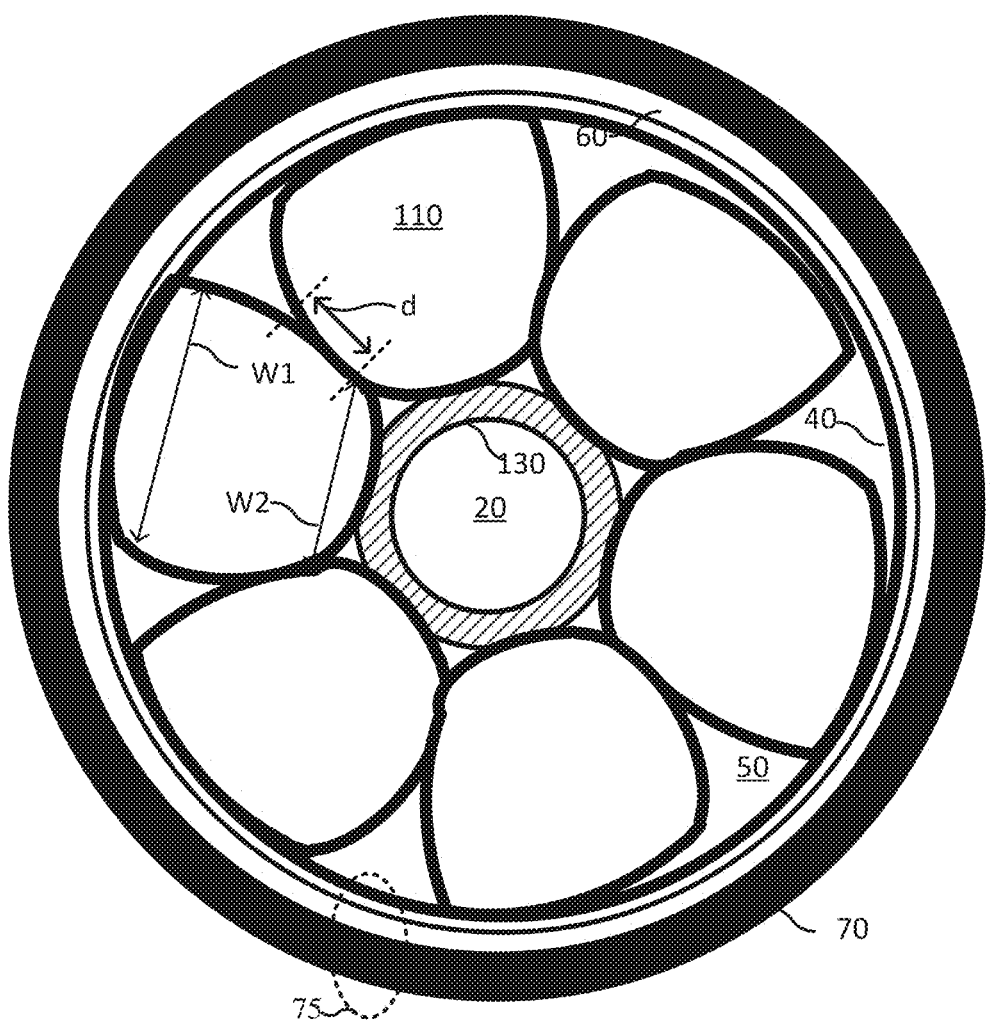

FIGS. 4A-4B illustrate further embodiments of the present invention having an additional deformable upjacket surrounding the central strength member.

In further embodiments, the upjacket material surrounding the strength member 20 may also include a deformable material. In various embodiments, the upjacket material is more compressible than the strength member 20 that is designed to be rigid.

As a consequence, the optical cable comprises a deformable upjacket 130 that has been deformed during the cable formation process. Depending on the deformable upjacket 130 material, the deformation of the deformable upjacket 130 may be purely elastic or may also include plastic deformation. The deformable nature of the upjacket provides additional way to compress and pack the cables by further improving contact between various components. In particular, the amount of voids or interstices within the optical cable may be further reduced relative to the embodiment of FIG. 2A. Additionally matching the modulus of interior components within a cable also results in a more equal stress distribution and a relatively lower deformation on the more compliant buffer tubes.

FIG. 4B illustrates an embodiment in which the buffer tubes as well as the deformable upjacket 130 (jacket material surrounding the strength member 20) undergo deformation during the formation of the optical cable.

While FIG. 4A illustrates a more ideal design, in practice, the deformed buffer tubes may be similar to the structure shown in FIG. 4B. For example, as illustrated in FIG. 4B, the deformable buffer tube no may have a first width W1 along the periphery of the optical cable and a second width W2 towards the central region of the optical cable.

Similarly, instead of abutting the adjacent buffer tube along the entire side, each deformable buffer tube no physically contacts the adjacent deformable buffer tube no over a distance d. The distance d may be of the same order as the first width W1 or the second width W2 in one embodiment. In other words, the distance d may be comparable to the first width W1 or the second width W2 in one embodiment. In one embodiment, the distance d may be substantially equal to the first width W1 or the second width W2. In various embodiments, a ratio of the distance d to the first width W1 is about 0.2 to about 1.5. In one or more embodiments, a ratio of the distance d to the second width W2 is about 0.2 to about 1.5. In comparison, in the conventional design illustrated in FIG. 1, adjacent conventional buffer tubes 10 contact with each other at a single point or over very short distances that approximate to a point.

Figure 5A:
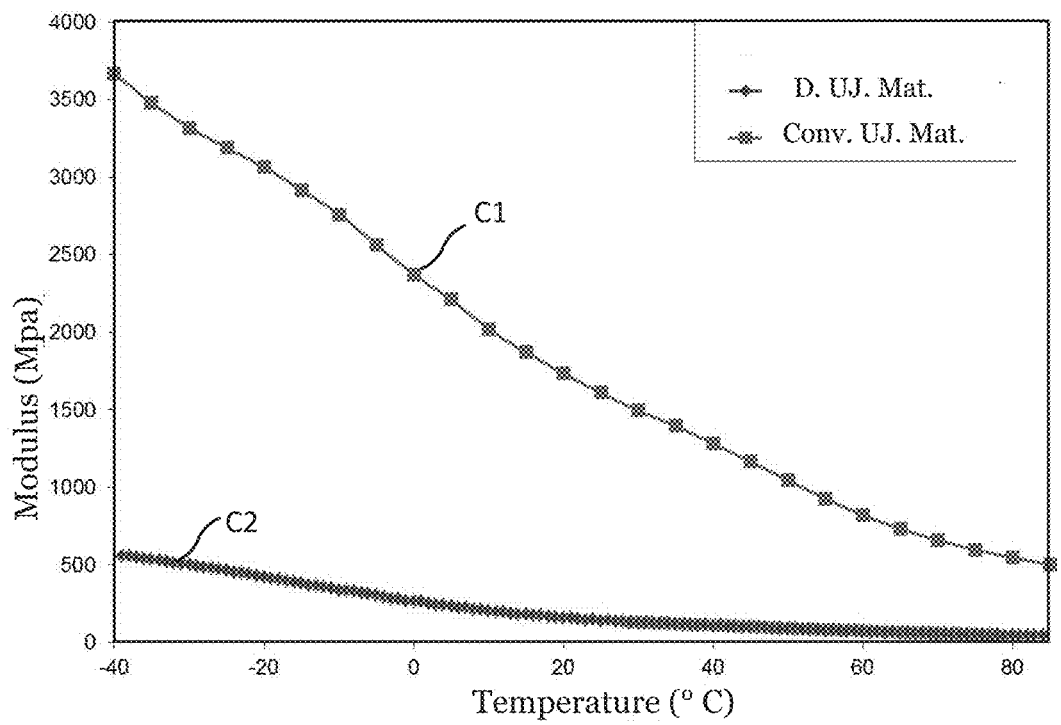
FIG. 5A illustrates the relationship between tensile modulus and temperature for different upjacket materials.

FIG. 5A illustrates the relationship between tensile modulus and temperature of various upjacket materials.

Referring to FIG. 5A, the x-axis represents temperature while the y-axis represents tensile modulus in MPa. Tensile modulus of a material is the ratio of the tensile stress applied to a material compared to the resulting extension (strain). For low deformations, compressive modulus is equal to the tensile modulus of the material.

In FIG. 5A, the first curve C1 represents a variation in tensile modulus of a conventional upjacket material (Cony. UJ. Mat.). Examples of such conventional material can be polypropylene. As illustrated in FIG. 5A, the tensile modulus increases strongly when the temperature is lowered. In contrast, the second curve C2 represents a variation in tensile modulus of an upjacket material comprising a deformable upjacket material (D. UJ. Mat.). One example of the deformable upjacket material is a thermoplastic elastomer such as santoprene 201-87.

The deformable buffer tubes no have a low yield stress and modulus, so a lower modulus upjacket material for the deformable upjacket 130 is desired to equalize compressive stresses in the cable during cable compression. If the compressive modulus of the material of the upjacket is much higher than the deformable buffer tubes no, the tubes will see a much higher deformation (strain) thereby resulting in greater stresses on the optical fibers contained within. In contrast, if the compressive modulus of the material of the upjacket is similar to the deformable buffer tubes 110, the deformable buffer tubes no have a reduced strain and the fibers contained within are under less stress.

Therefore, the deformable upjacket material is selected to have low shrinkage, low coefficient of thermal expansion, as well as low modulus over a wide temperature range. As illustrated, in various embodiments, the deformable upjacket material is selected to have a room temperature modulus below about 700 MPa and a −40° C. modulus below about 1 GPa and a coefficient of thermal expansion below about 2×10-4/° C. in the temperature range from room temperature to −40° C. In one embodiment, the deformable upjacket may be selected to have a modulus between 50 MPa and 600 MPa within a temperature range between −40° C. to 20° C.

In one illustration as represented by the second curve C2, the deformable upjacket material is selected to have a room temperature modulus below about 150 MPa and a −40° C. modulus below about 600 MPa and a coefficient of thermal expansion below about 1.5×10-4/° C. in the temperature range from room temperature to −40° C. In one illustration, santoprene 201-87 has a low modulus and low coefficient of thermal expansion (about $1.23 \times 10^{-4}/°$ C.). As used herein modulus or tensile modulus is determined in accordance with ASTM D638-14 *"Standard Test Method for Tensile Properties of Plastics"* published by ASTM International, West Conshohocken, Pa., 2014.

Referring to the experimental data, a deformable upjacket material comprising santoprene 201-87 exhibits a lower sensitivity to temperature relative to conventional upjacket material. Even at lower end of the test, e.g., at −40 C, the deformable upjacket material has a compressive modulus of about 550 MPa, which is almost six times smaller than the conventional upjacket material.

Figure 5B:
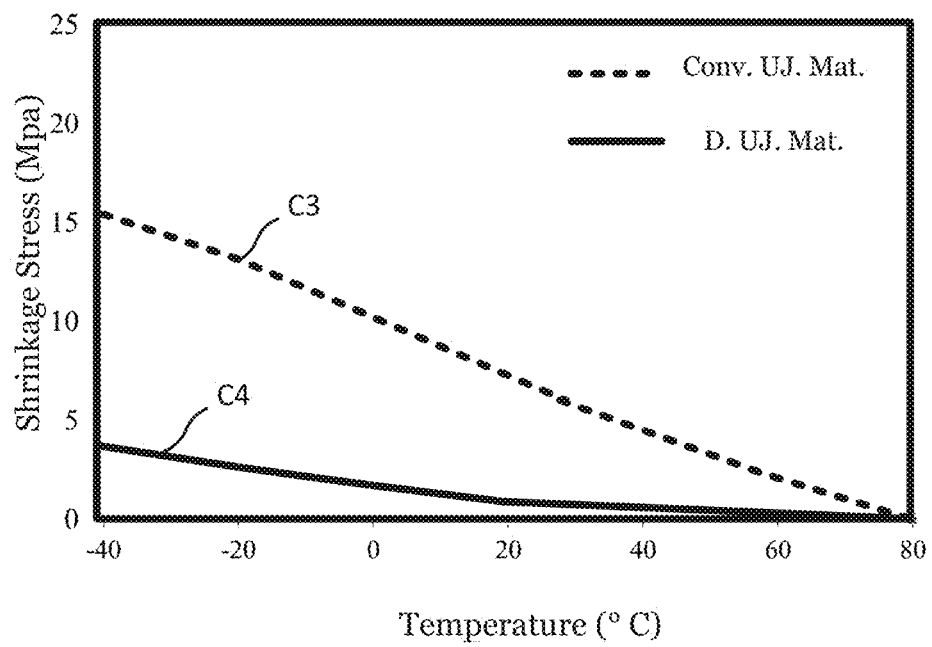
FIG. 5B illustrates the shrinkage stress for different upjacket materials as a function of temperature.

FIG. 5B illustrates the shrinkage stress for various upjacket materials as a function of temperature. The shrinkage stress illustrated in FIG. 5B was calculated from coefficient of thermal expansion data and modulus data as determined through DMA analysis of the different materials on a TA Instruments DMA 2980 Dynamic Mechanical Analyzer equipped with liquid nitrogen cooling for sub-ambient temperature operation.

In FIG. 5B, the third curve C3 represents a conventional upjacket material while the fourth curve C4 represents a deformable upjacket material. As is evident, the conventional upjacket material results in substantially increased shrinkage stress compared to the deformable upjacket material.

FIGS. 5A and 5B collectively suggest that replacing the conventional upjacket material with a deformable upjacket material is likely to produce cables with better optical and mechanical performance.

Several tests were performed to determine the viability of applicant's embodiments. One set of the experiments illustrated in FIGS. 5D and 5E were performed on samples comprising different upjacket materials.

Figure 5C:
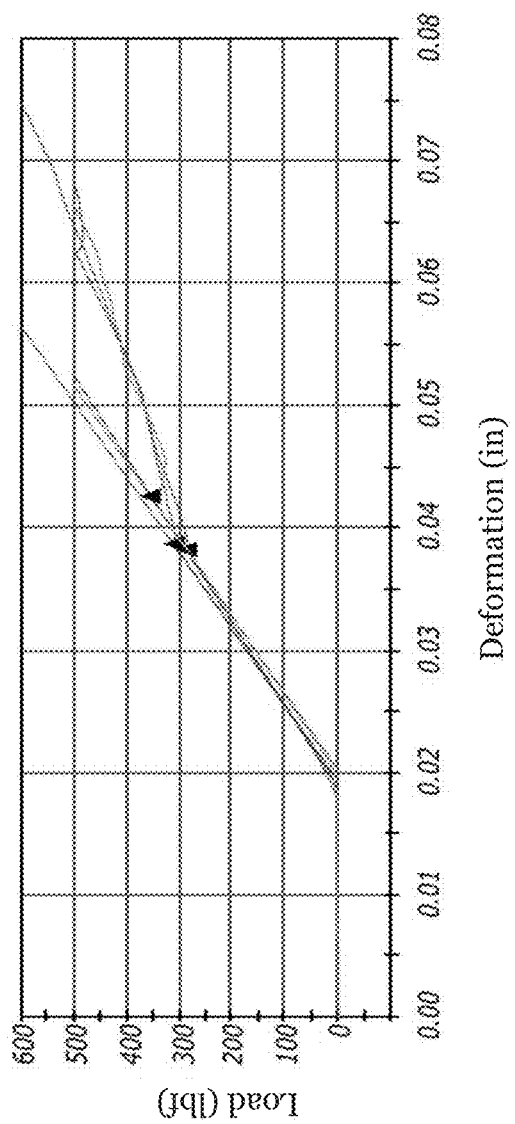
FIG. 5C illustrates a determination of compressive modulus from the slope of the load—deformation curve before the yield point.

The experiments illustrated in the tables of FIGS. 5D and 5E were performed on optical cables comprising 1728 optical fibers with six buffer tubes in which one of the buffer tube is a dummy tube filled with gel. The buffer tubes surround a glass reinforced polymer core forming the strength member 20. The compression tests were performed on individual upjacketed central strength member as well as on individual deformable buffer tubes. The compression tests were performed in an Instron 5567 (S.N. C5456) testing machine with samples fixed between two four inch parallel plates. A strain rate of 0.05 in/min and ambient temperature of 22° C. was used for the testing. Compressive modulus is determined from the slope of the load—deformation curve before the yield point as illustrated in FIG. 5C, where the triangles represent the yield point for three different specimens or samples. The obtained modulus (slope of load versus deformation) could be further normalized by the length of sample under compression so as to result in the compressive modulus having the units of MPa or lbf/in². The results in FIGS. 5D and 5E illustrate the raw numbers prior to such length normalization. The test procedure described herein is for illustrative purposes and is not to be considered as the only way to test for the compressive modulus. It is further noted that a different experimental setup such as, for example, using two inch parallel plates instead of four inch parallel plates, will result in different numbers for the modulus, although the results are expected to be similar qualitatively as well as relatively.

FIG. 5D illustrates a table summarizing compression test results from testing the central strength member.

First, as illustrated in FIG. 5D, the compression tests were conducted individually for the upjacketed central strength member, while the upjacket material was varied. In particular, these tests were performed by de-processing a finished optical cable to form individual elements such as an individual buffer tube or an individual strength member encapsulated with the upjacket material.

In the illustrated table, the upjacket diameter is the outer diameter of the upjacket material while the S.M. diameter is the diameter of the central strength member 20, which in this case comprises a glass reinforced polymer.

The second and third columns show the test results of using a solid polypropylene upjacket material. The compressive modulus of these samples is very high about 40,000 lbf/in, which is the modulus normalized per sample length (noting that modulus is normally expressed in lbf/in$^2$ or MPa) For the fourth to sixth columns, the upjacket material comprises a foamed polypropylene material. The foam content is varied between 45%, 35%, and 40% while keeping the other parameters unchanged. The use of the foamed polypropylene upjacket causes a 2× (half) reduction in the compressive modulus.

The seventh column illustrates the test results from using a deformable material upjacket such as a thermoplastic elastomer such as Santoprene 201-87 CCT. The deformable upjacket material reduces the compressive modulus further to about 15,000 lbf/in. Compared to the solid polypropylene upjacket, the thermoplastic elastomer results in greater than 60% reduction in compressive modulus. Similarly, compared to the foamed polypropylene upjacket, the thermoplastic elastomer results in greater than 20% reduction in compressive modulus.

FIG. 5E illustrates a table comparing the compression test results from testing the central strength member to the buffer tube.

The fourth column of FIG. 5E summarizes the results from FIG. 5D where the deformable upjacket material has a compressive modulus of about 15,000 lbf/in. In contrast, the second column and the third column illustrate the compression test results of individual deformable buffer tubes. The second column illustrates the results prior to the deformation of the deformable buffer tubes, i.e., before being placed within an optical cable and compressed. In contrast, the third column illustrates the results after forming compressing the buffer tube within the optical cable and is therefore representative of the real product. The deformed buffer tube exhibits a slightly higher compressive modulus but not significantly different than the undeformed buffer tube. However, more importantly, the deformable buffer tubes have a much smaller compressive modulus than the deformable upjacket material.

In various embodiments, the deformable upjacket material is selected so as to have a compressive modulus similar to the compressive modulus of the buffer tube. In one or more embodiments, the deformable upjacket material is selected such that the ratio of compressive modulus of the buffer tube to the compressive modulus of the deformable upjacket material is less than 1:20, or in one embodiment to be between 1:1 and 1:20.

In this example embodiment, the ratio of compressive modulus of the buffer tube to the compressive modulus of the deformable upjacket material is about 1:18. In contrast, this ratio increases to 1:25 for the foamed polypropylene upjacket and to 1:45 for the solid polypropylene upjacket.

FIGS. 6-12 describe specific implementations of different designs for the optical cable in accordance with various embodiments of the present invention.

Figure 6A:
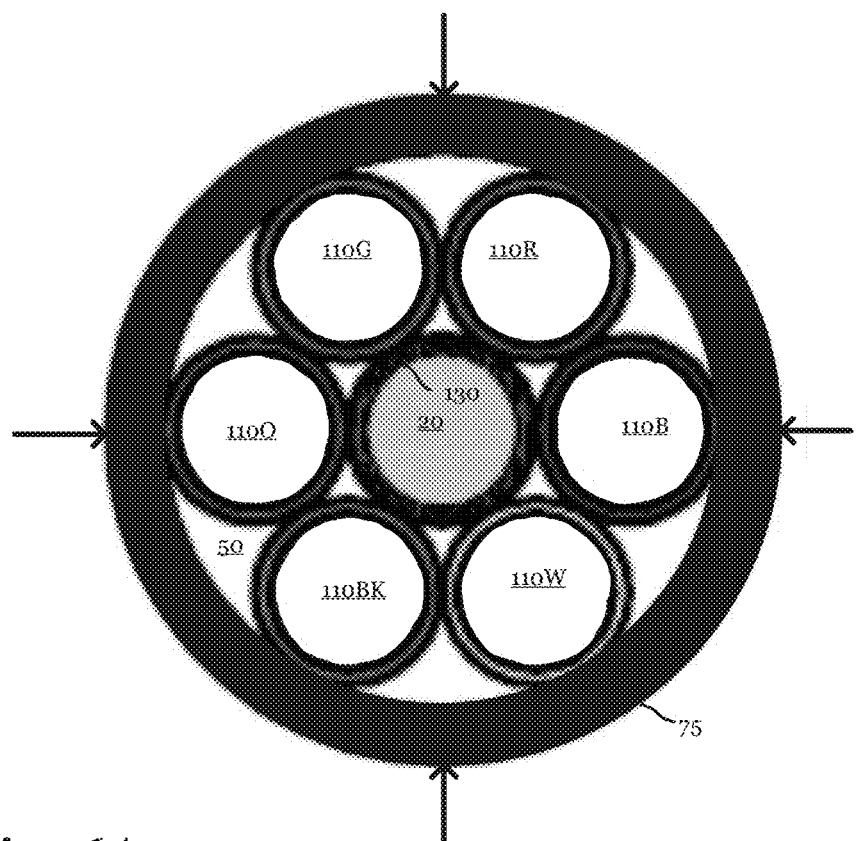
Figure 6C:
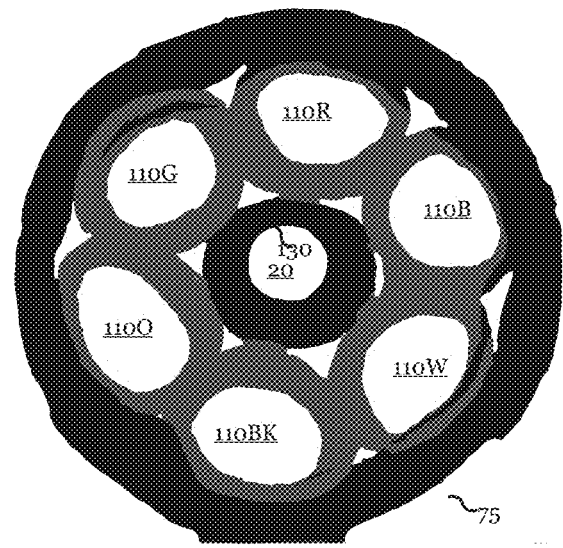
Figure 6B:
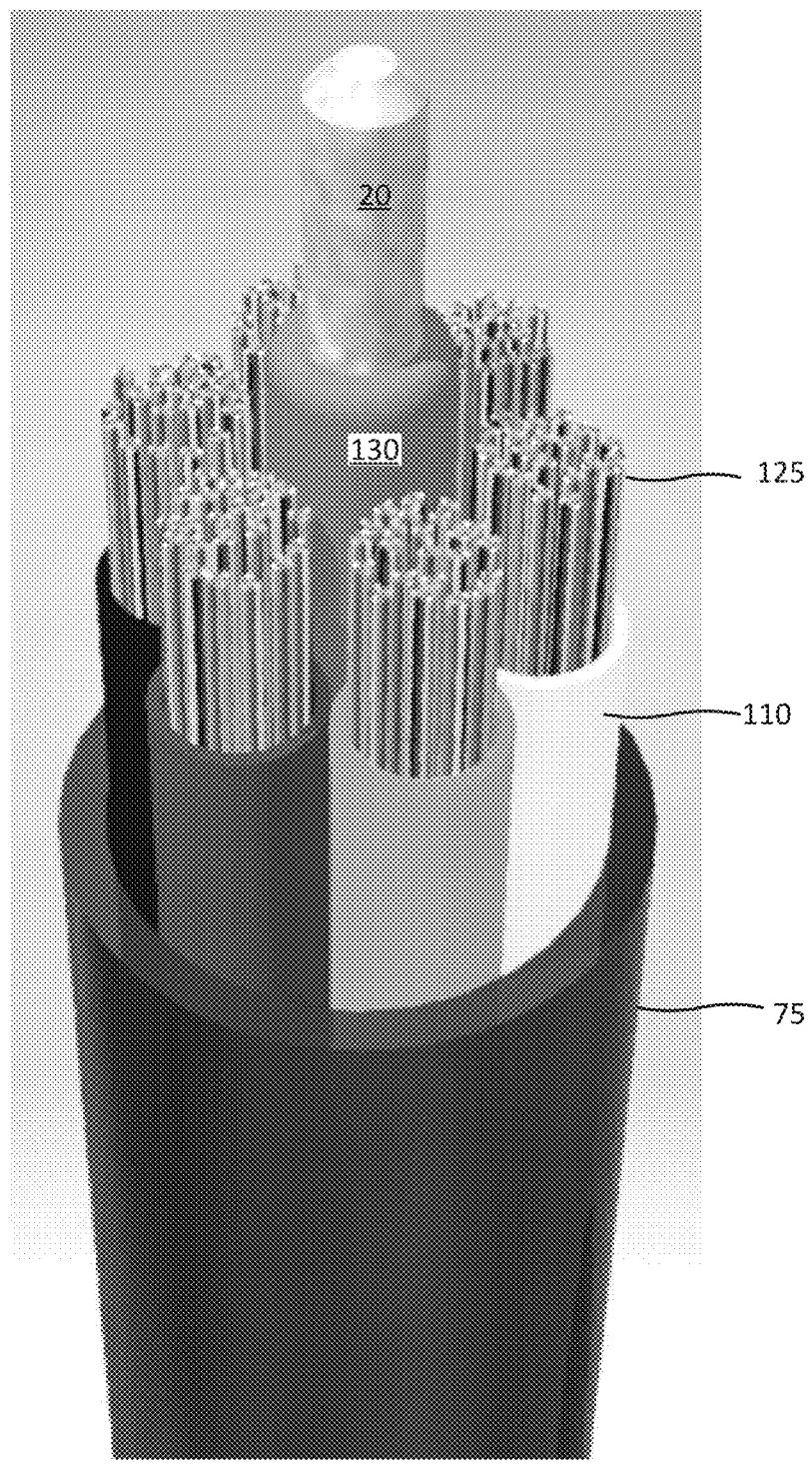

FIGS. 6A-6C illustrate an example embodiment of an optical cable, wherein FIG. 6A illustrates a cross-sectional design view of the optical cable prior to compression and FIG. 6B illustrates a corresponding projection view, and wherein FIG. 6C illustrates a cross-sectional view of the optical cable after compression. FIGS. 6A-6B illustrate the design arrangement and are not representative of the final shape, which will be as discussed above. The circular cross-sections illustrated here are provided for ease of illustration.

Referring to FIGS. 6A-6B, the optical cable comprises an outer cover 75 within which six deformable buffer tubes no labeled herein as 110R, 110B, 110W, 110BK, 110O, and 110G are arranged concentrically around a strength member 20 that is rigid. The strength member 20 is jacketed with a deformable upjacket 130. The outer layer of the deformable buffer tubes 110R, 110B, 110W, 110BK, 110O, and 110G may be colored for identification such as red, blue, white, black, orange, green, etc.

FIG. 6C illustrates the optical cable of FIG. 6A after compression. Although the cross-section of FIG. 6C includes some interstices 50, the deformable buffer tubes no have deformed significantly in trying to lower the amount of area occupied by the interstices 50 relative to FIG. 6A. In various embodiments, in reality, the amount of deformation would depend on both external as well as internal factors. Examples of external factors include the amount of compression applied on the buffer tubes (e.g., arrows in FIG. 6A), the time for which compression is applied, the temperature at which compression is applied etc., while examples of internal factors include the material and thickness of the buffer tube jacket, the flexibility of the flexible ribbons within the buffer tubes, and the stacking arrangement of the flexible ribbons.

In one example of the optical cable illustrated in FIGS. 6A-6C, the cable diameter is 24.7 mm and includes six buffer tubes, where each buffer tube contains 288 optical fibers in which each fiber has a diameter of 250 μm. Thus, the cable of FIGS. 6A-6C includes 1728 fibers with a percent fill of about 78%, which is the ratio of the duct size diameter to the cable outer diameter. Thus, the cable of FIG. 6C can easily pass through a 1.25 inch duct.

Figure 7A:
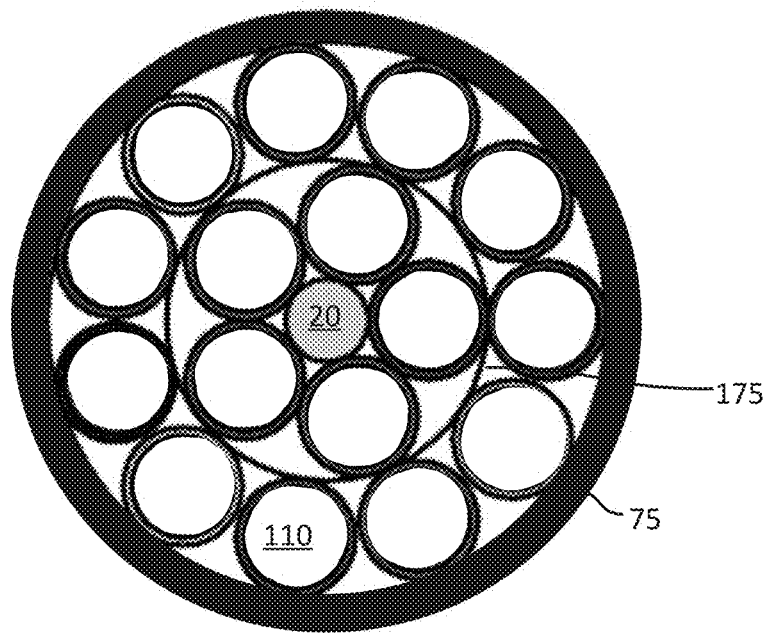

FIGS. 7A-7B illustrates a specific design for an optical cable in accordance with an alternative embodiment of the invention, wherein FIG. 7A illustrates a cross-sectional view of the optical cable prior to compression and FIG. 7B illustrates a corresponding projection view. As with FIGS. 6A-6B, FIGS. 7A-7B illustrate the design arrangement and are not representative of the final shape.

FIGS. 7A-7B illustrate an alternative design in which the deformable buffer tubes no are arranged in multiple concentric paths around a central strength member 20. In addition, after the first row of the deformable buffer tubes no are arranged, a support layer 175 may be introduced for reinforcing the first row of the deformable buffer tubes 110. The support layer 175 may comprise a material having sufficient property to reinforce the buffer tubes that are enclosed by it but at the same is also deformable so that it can be squeezed or deformed. Examples of materials used for the support layer 175 include polypropylene, polyethylene, nylon, polyurethane, and others.

Another set of the deformable buffer tubes no are arranged around the support layer 175. An outer cover 75 is disposed around the multiple rows of the deformable buffer tubes 110 and includes an outer jacket of the cable.

Unlike FIGS. 6A-6C, the subsequent cross-section view of the optical cable after undergoing deformation is not illustrated in FIGS. 7A-7B. However, the individual buffer tubes are similarly deformed as described in detail in the prior embodiments.

In an example of the embodiment of FIGS. 7A-7B, the optical cable has a cable diameter of 37.4 mm with five buffer tubes in the first row and eleven buffer tubes in the second row. Each buffer tube contains 432 optical fibers in which each fiber has a diameter of 200 µm. Thus, the cable of FIGS. 7A-7B includes 6912 fibers with a percent fill of about 74%, which is the ratio of the duct size diameter to the cable outer diameter. Thus, the cable of FIGS. 7A-7B can easily pass through a two inch duct, and perhaps even through a 1.5 inch duct.

Figure 8A:
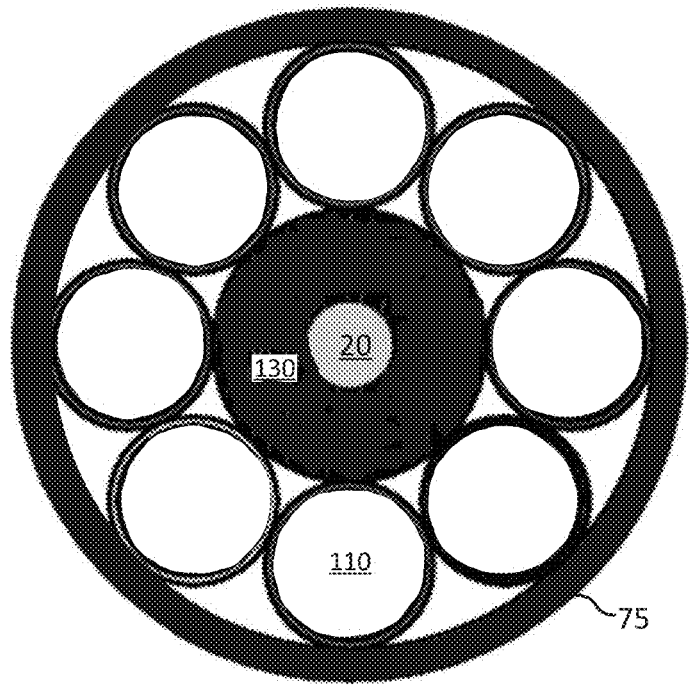

FIGS. 8A-8B illustrates a specific design for an optical cable in accordance with an alternative embodiment of the invention, wherein FIG. 8A illustrates a cross-sectional view of the optical cable prior to compression and FIG. 8B illustrates a corresponding projection view. Once again, FIGS. 8A-8B illustrate the design arrangement and are not representative of the final shape.

In the embodiment of FIGS. 8A-8B, a deformable upjacket 130 surrounds the central strength member 20. In various embodiments, the thickness of the deformable upjacket 130 may be different from the diameter of the strength member 20. For example, the thickness of the deformable upjacket 130 is larger than the diameter of the strength member 20 in the illustrated embodiment. However, in other embodiments, the thickness of the deformable upjacket 130 may be the same as the diameter of the strength member 20. In one embodiment, the thickness of the deformable upjacket 130 may be similar to the diameter of the strength member 20. Eight buffer tubes are arranged around the outer periphery of the deformable upjacket 130. In an example of the embodiment of FIGS. 8A-8B, the optical cable has a cable diameter of 38.8 mm with eight buffer tubes. Each buffer tube contains 864 optical fibers in which each fiber has a diameter of 200 µm. Thus, the cable of FIGS. 8A-8B includes 6912 fibers with a percent fill of about 76%, which is the ratio of the duct size diameter to the cable outer diameter. Thus, the cable of FIGS. 8A-8B can easily pass through a two inch duct, and perhaps even through a 1.5 inch duct.

The subsequent cross-section view of the optical cable after undergoing deformation is not illustrated in FIGS. 8A-8B. However, the individual buffer tubes are deformed as described in detail similar to the prior embodiments.

Figure 9A:
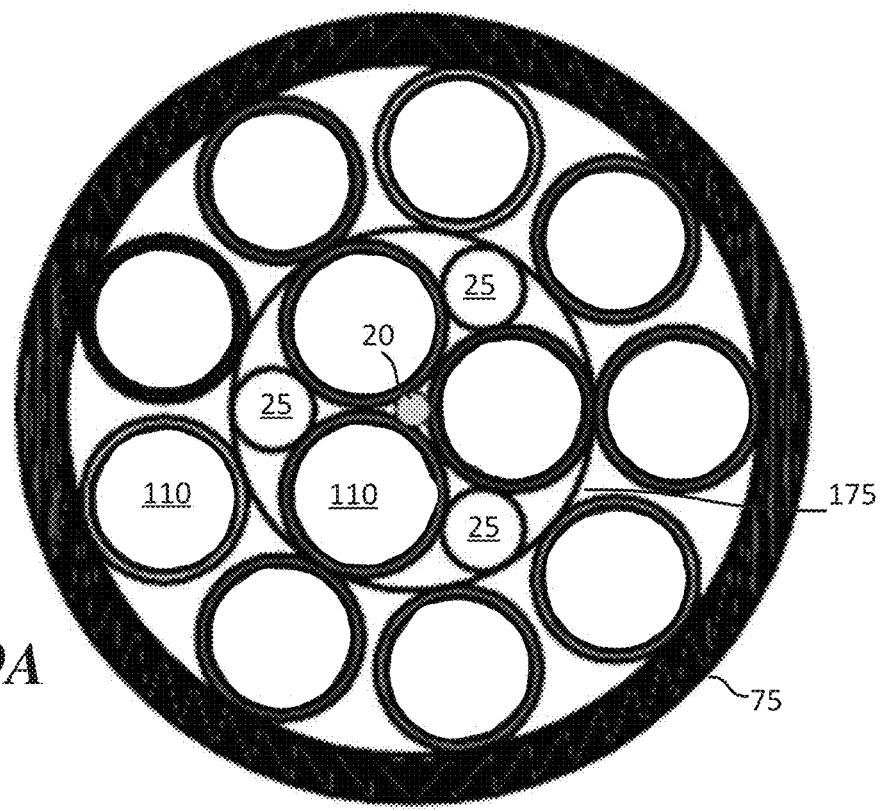
Figure 9B:
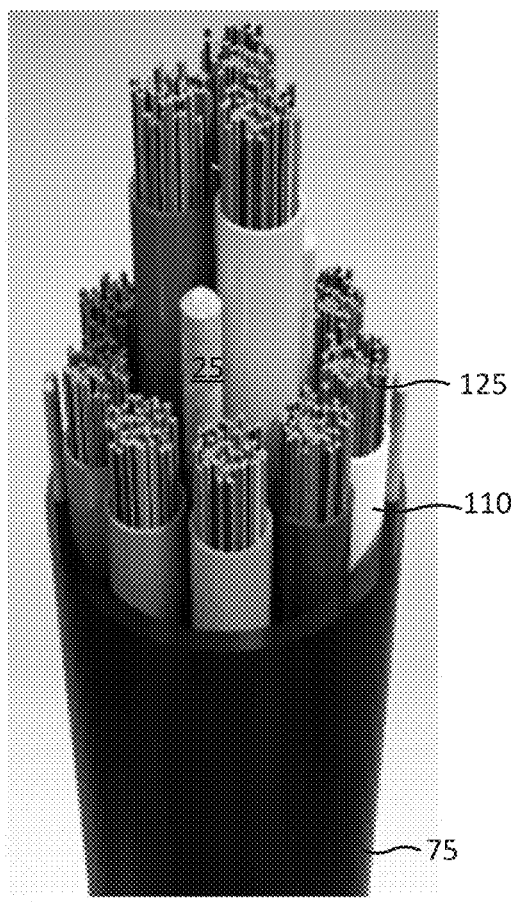

FIGS. 9A-9B illustrates a specific design for an optical cable in accordance with an alternative embodiment of the invention, wherein FIG. 9A illustrates a cross-sectional view of the optical cable prior to compression and FIG. 9B illustrates a corresponding projection view. As previously discussed, FIGS. 9A-9B illustrate the design arrangement and are not representative of the final shape.

The optical cable in this embodiment are designed similar to the embodiment of FIGS. 7A-7B in that they do not include an upjacket around the central strength member and further include two rows of buffer tubes around the central region. However, in this embodiment, a smaller number of buffer tubes are arranged in the first row. Instead of five buffer tubes arranged in FIGS. 7A-7B, in this embodiment three buffer tubes are arranged in the first row.

However, unlike the prior embodiments, this embodiment also includes additional strength members 25 that are placed around the strength member 20. The additional strength members 25 are separated from the strength member 20 by the deformable buffer tubes 110 in the first row. In one embodiment, the number of the additional strength members 25 is the same as the number of the deformable buffer tubes 110 in the first row. The additional strength members 25 provide additional rigidity to the optical cable for supporting a larger number of buffer tubes. In particular, the additional strength members 25 along with the strength members 20 make better use of space since they are smaller in diameter relative to the deformable buffer tubes 110 by at least a factor of two.

Consequently, in the embodiment of FIGS. 9A-9B, three deformable buffer tubes no are arranged in a first row and enclosed by a support layer 175. Another nine deformable buffer tubes no are arranged around the support layer 175. In an example of the embodiment of FIGS. 9A-9B, the optical cable has a cable diameter of 39.4 mm. Each buffer tube contains 576 optical fibers in which each fiber has a diameter of 200 µm. Thus, the cable of FIGS. 9A-9B includes 6912 fibers with a percent fill of about 78%, which is the ratio of the duct size diameter to the cable outer diameter. Thus, the cable of FIGS. 9A-9B can easily pass through a two inch duct.

The subsequent cross-section view of the optical cable after undergoing deformation is not illustrated in FIGS. 9A-9B. However, the individual buffer tubes are deformed as described in detail similar to the prior embodiments.

Figure 10A:
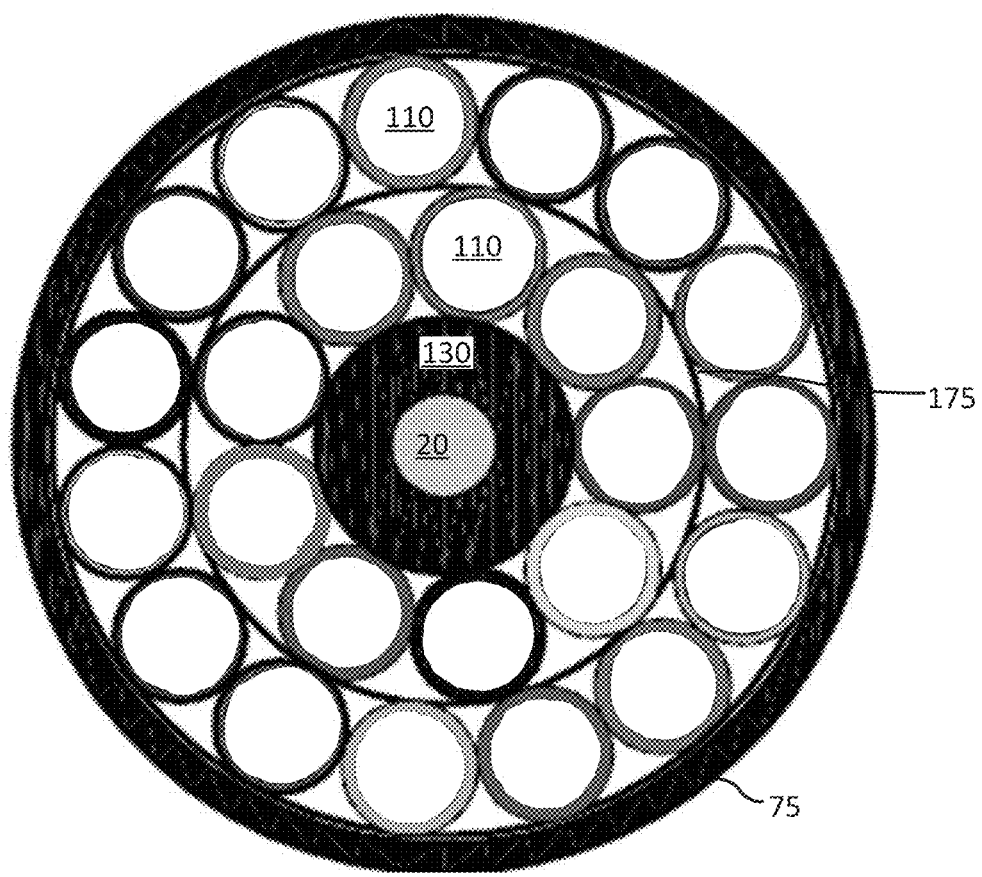
Figure 10B:
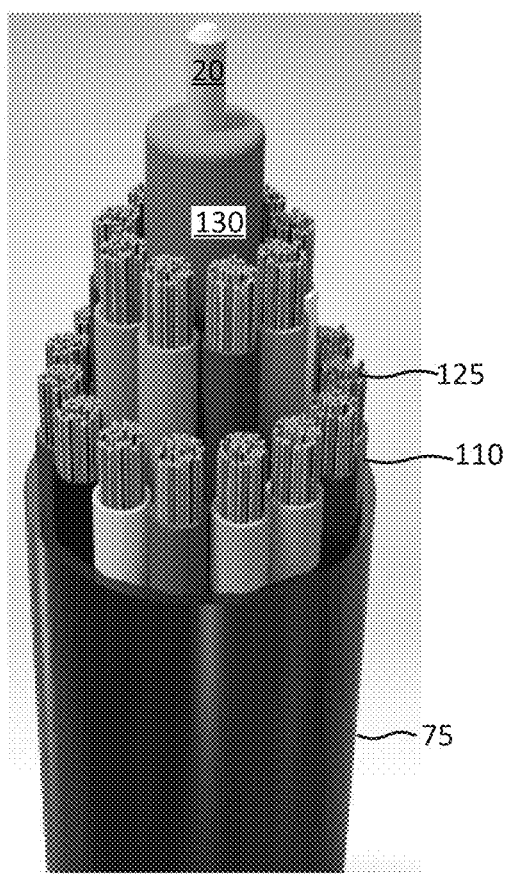

FIGS. 10A-10B illustrates a specific design for an optical cable in accordance with an alternative embodiment of the invention, wherein FIG. 10A illustrates a cross-sectional view of the optical cable prior to compression and FIG. 10B illustrates a corresponding projection view. As previously discussed, FIGS. 10A-10B illustrate the design arrangement and are not representative of the final shape.

This embodiment combines features from the prior embodiments described in FIGS. 7-9. For example, this embodiment includes a deformable upjacket 130 around the strength member 20 as described, for example, in FIG. 8A. Similar to embodiment of FIG. 7A, a first row of deformable buffer tubes no is arranged around the deformable upjacket 130. The first row of deformable buffer tubes no include nine buffer tubes that are enclosed within a support layer 175. A second of deformable buffer tubes no including fifteen buffer tubes are arranged around the support layer 175.

Consequently, in an example of the embodiment of FIGS. 10A-10B, the optical cable has a cable diameter of 40.5 mm. Each buffer tube contains 288 optical fibers in which each fiber has a diameter of 200 µm. Thus, the cable of FIGS. 10A-10B includes 6912 fibers with a percent fill of about 80%, which is the ratio of the duct size diameter to the cable outer diameter. Thus, the cable of FIGS. 10A-10B can easily pass through a two inch duct.

The subsequent cross-section view of the optical cable after undergoing deformation is not illustrated in FIGS. 10A-10B. However, the individual buffer tubes are deformed as described in detail similar to the prior embodiments.

Figure 11A:
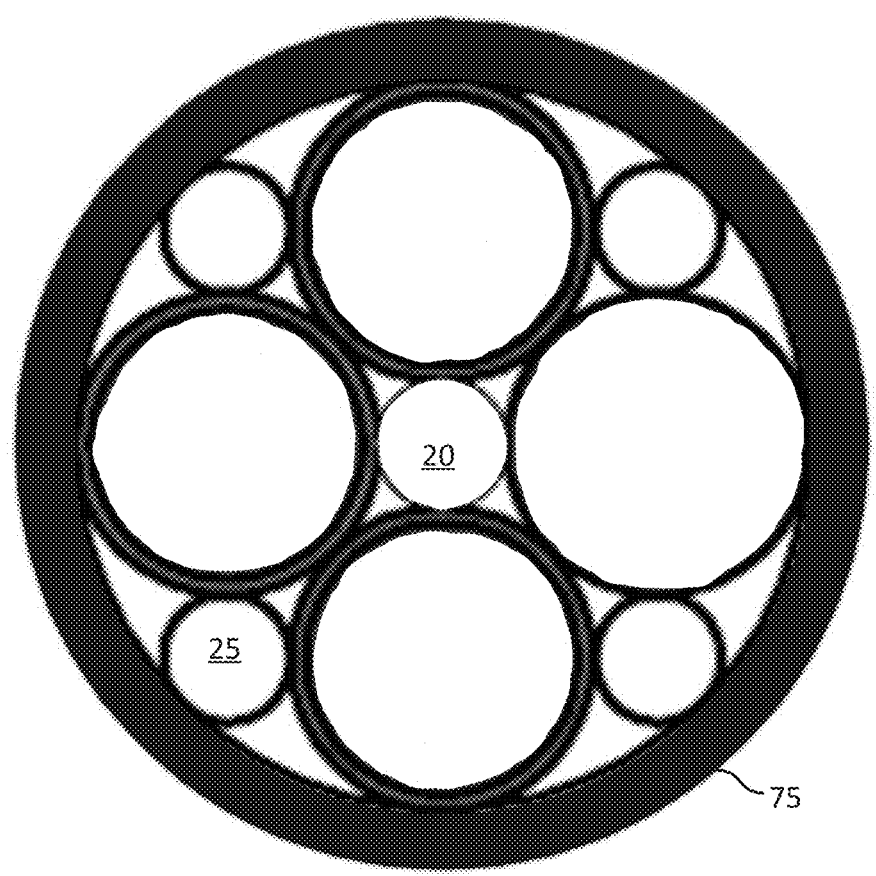
Figure 11B:
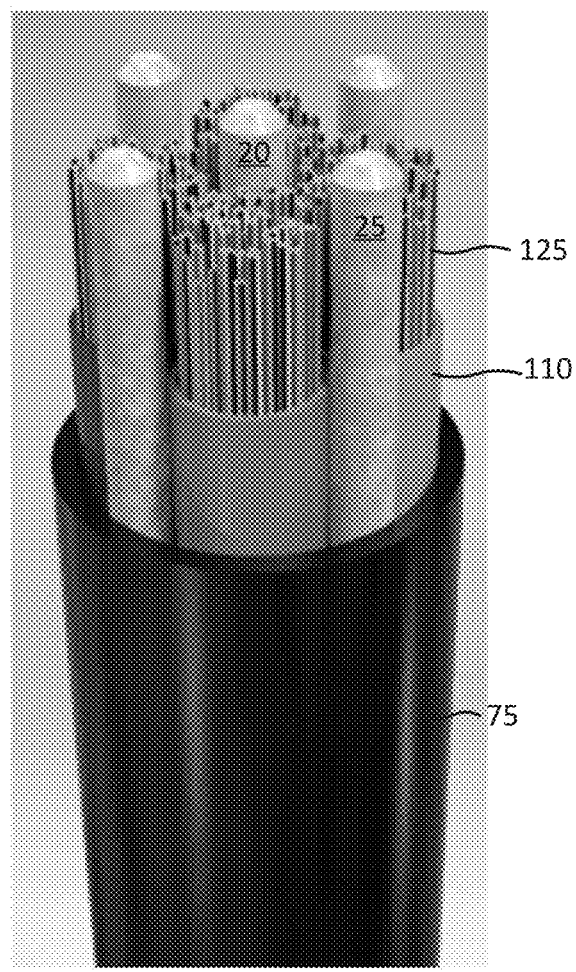

FIGS. 11A-11B illustrates a specific design for an optical cable in accordance with an alternative embodiment of the invention, wherein FIG. 11A illustrates a cross-sectional view of the optical cable prior to compression and FIG. 11B illustrates a corresponding projection view. As previously discussed, FIGS. 11A-11B illustrate the design arrangement and are not representative of the final shape.

This embodiment is similar to FIGS. 9A-9B because it includes additional strength members 25 arranged between the deformable buffer tubes no. Adjacent additional strength members 25 are separated from each other as well as from the strength member 20 by one of the deformable buffer tubes no. In one embodiment, the number of the additional strength members 25 is the same as the number of the deformable buffer tubes no in the first row.

Again as in the embodiments of FIGS. 9A-9B, no additional upjacket is used around the strength member 20 or the additional strength member 25. However, in some embodiments, either or both of these strength members may be jacketed with a deformable upjacket material.

The subsequent cross-section view of the optical cable after undergoing deformation is not illustrated in FIGS. 11A-11B. However, the individual buffer tubes are deformed as described in detail similar to the prior embodiments.

Consequently, in an example of the embodiment of FIGS. 11A-11B, the optical cable has a cable diameter of 26.8 mm. Each buffer tube contains 864 optical fibers in which each fiber has a diameter of 200 μm. Thus, the cable of FIGS. 11A-11B includes 3456 fibers with a percent fill of about 70%, which is the ratio of the duct size diameter to the cable outer diameter. Thus, the cable of FIGS. 11A-11B can easily pass through a 1.5 inch duct.

Figure 12:
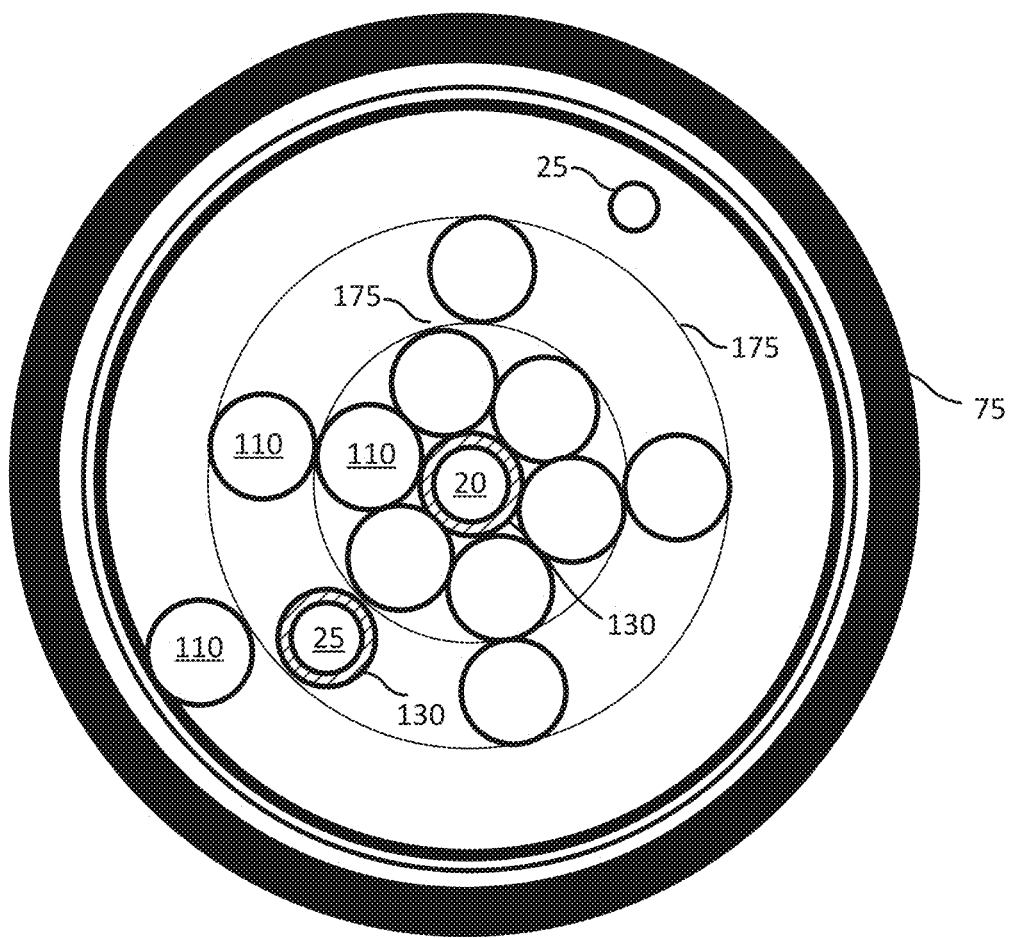
FIG. 12 illustrates a generic embodiment showing a combination of features described in various embodiments of the present invention.

FIG. 12 illustrates a generic embodiment showing a combination of features described in various embodiments of the present invention. The subsequent cross-section view of the optical cable after undergoing deformation is not illustrated in FIG. 12. However, the individual buffer tubes are deformed as described in detail similar to the prior embodiments.

As illustrated in FIG. 12, an optical cable may comprise multiple rows of deformable buffer tubes 110 arranged around a central strength member 20. As also illustrated in FIG. 12, the central strength member may include a deformable upjacket 130 surrounding the same. For clarity, not all the elements such as the buffer tubes 110 are illustrated. A first row of deformable buffer tubes surround the central strength member 20. In addition, the optical cable may comprise multiple rows of buffer tubes arranged after the first row. In the illustration, two rows of deformable buffer tubes 110 are arranged around the first row. Any of the rows may include additional strength member 25. For example, in the illustration, the second and third rows include additional strength members 25. In additional embodiments, the first row may also include additional strength members 25. In addition, the additional strength members 25 may be sized differently from the other additional strength members 25 in other rows including the central strength member 20. Further, some or all of the additional strength members 25 may include a deformable upjacket 130 around it.

FIGS. 13A-13B is a table summarizing example embodiments of the different cable design in accordance with various embodiments of the present invention.

As illustrated in the table of FIGS. 13A-13B, a number of specific designs are tabulated. The cable diameter references the outer diameter of the cable while the duct size references the size of the duct through which the cable can pass through. The subsequent columns follow the design arrangement of the buffer tubes within the cable. For example, the total number of buffer tubes is all of the buffer tubes within the cable while the number of rows of buffer tubes represents the number of concentric arrangements of the buffer tubes. For example, FIG. 7A has two rows (two concentric arrangement of the buffer tubes). The first row of the buffer tube is the row immediately surrounding or adjoining the central strength member. The use of upjacket surrounding the central strength member is summarized as a positive (yes) or a negative (no). In various designs that include additional strength members, the additional strength members may be larger or about the same size as the central strength member. As noted earlier, the fill % is the ratio of the duct size diameter to the cable outer diameter.

As noted in FIGS. 13A and 13B, using embodiments of the present invention, a fill % of about 70% to about 80% is obtained. Similarly, the number of fibers per unit area for each cable can be as high as 6.3 fibers/mm², or alternately, the number of fibers per unit area for each cable can vary between 3.5 fibers/mm² to 6.5 fibers/mm².

Figure 14:
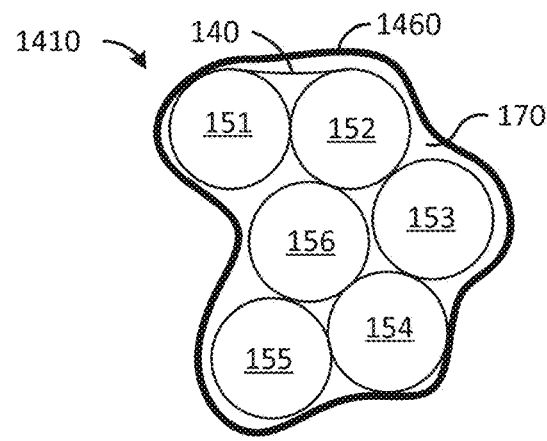
FIG. 14 illustrates a deformable buffer tube formed using a single flexible ribbon and usable with embodiment optical cables of the present invention.

FIG. 14 illustrates a deformable buffer tube formed using a single flexible ribbon and usable with embodiment optical cables of the present invention. For example, the deformable buffer tube of FIG. 14 may replace the deformable buffer tubes of any other embodiment optical cables such as the optical cables of FIGS. 2A-2E, 3, 4A-4B, 12, and others.

Referring to FIG. 14, a deformable buffer tube 1410 includes a single flexible ribbon 140 which may be as previously described. That is, the flexible ribbon 140 may include any suitable number of optical fibers. For example the flexible ribbon 140 may include first, second, third, fourth, fifth, and sixth optical fibers 151-156 as shown. A possible advantage of including a single flexible ribbon in each deformable buffer tube of an optical cable is to facilitate easier identification of individual optical fibers within the optical cable.

The flexible ribbon 140 is enclosed by a buffer tube jacket 1460 which may be a specific embodiment of other buffer tube jackets described herein, such as the buffer tube jacket 160 of FIG. 2E, for example. Additionally, the buffer tube jacket 1460 may be smaller than buffer tube jackets that are used to enclose multiple flexible ribbons. Alternatively, the number of optical fibers in the flexible ribbon may be increased compared to embodiments with multiple flexible ribbons per buffer tube jacket and the buffer tube jacket 1460 may be of equal size or even larger than buffer tube jackets enclosing multiple flexible ribbons.

Figure 15:
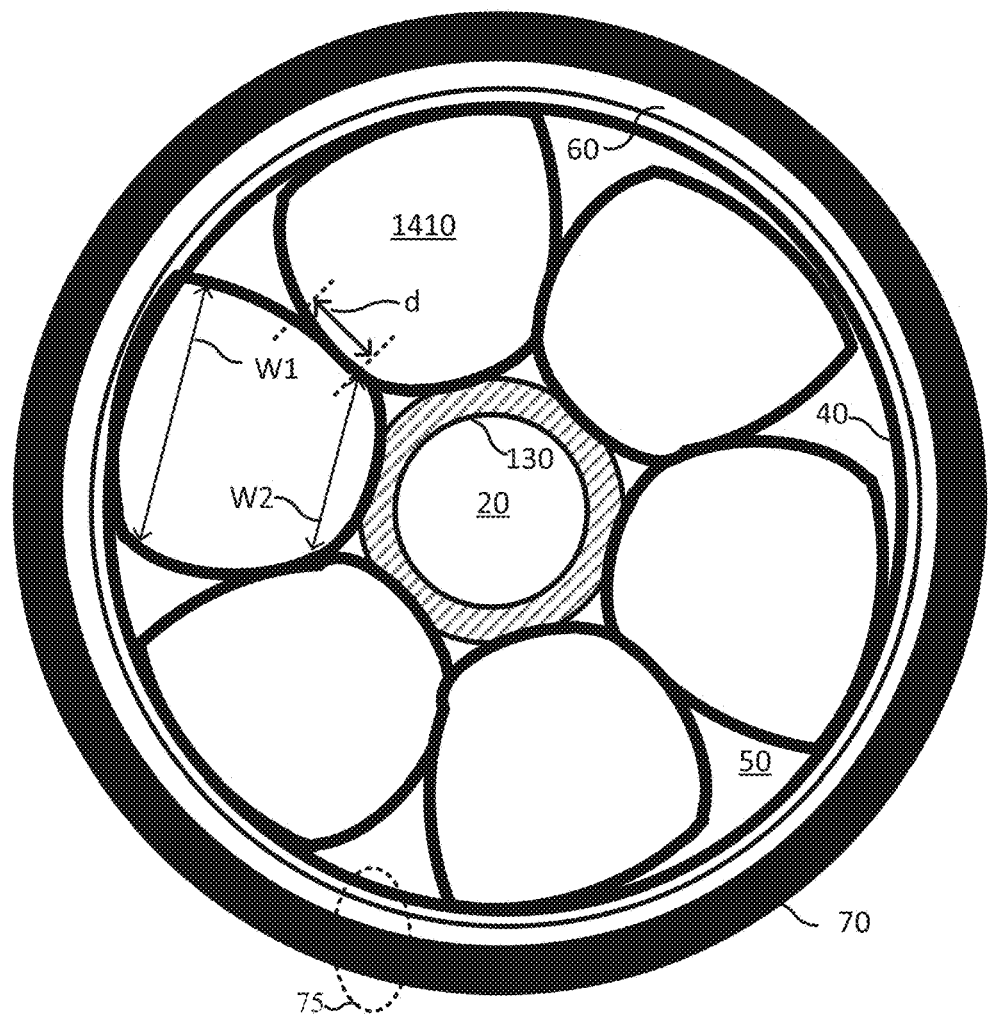
FIG. 15 illustrates a further embodiment of the present invention having an additional deformable upjacket surrounding the central strength member and including a plurality of deformable buffer tubes each formed using a single flexible ribbon.
Figure 16:
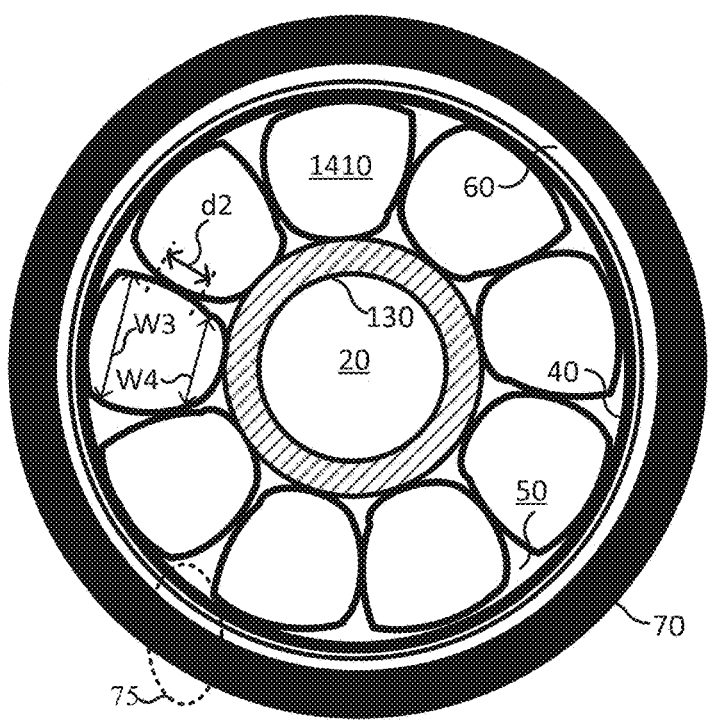
FIG. 16 illustrates a still further embodiment of the present invention having an additional deformable upjacket surrounding the central strength member and including a plurality of deformable buffer tubes each formed using a single flexible ribbon.
Figure 17:
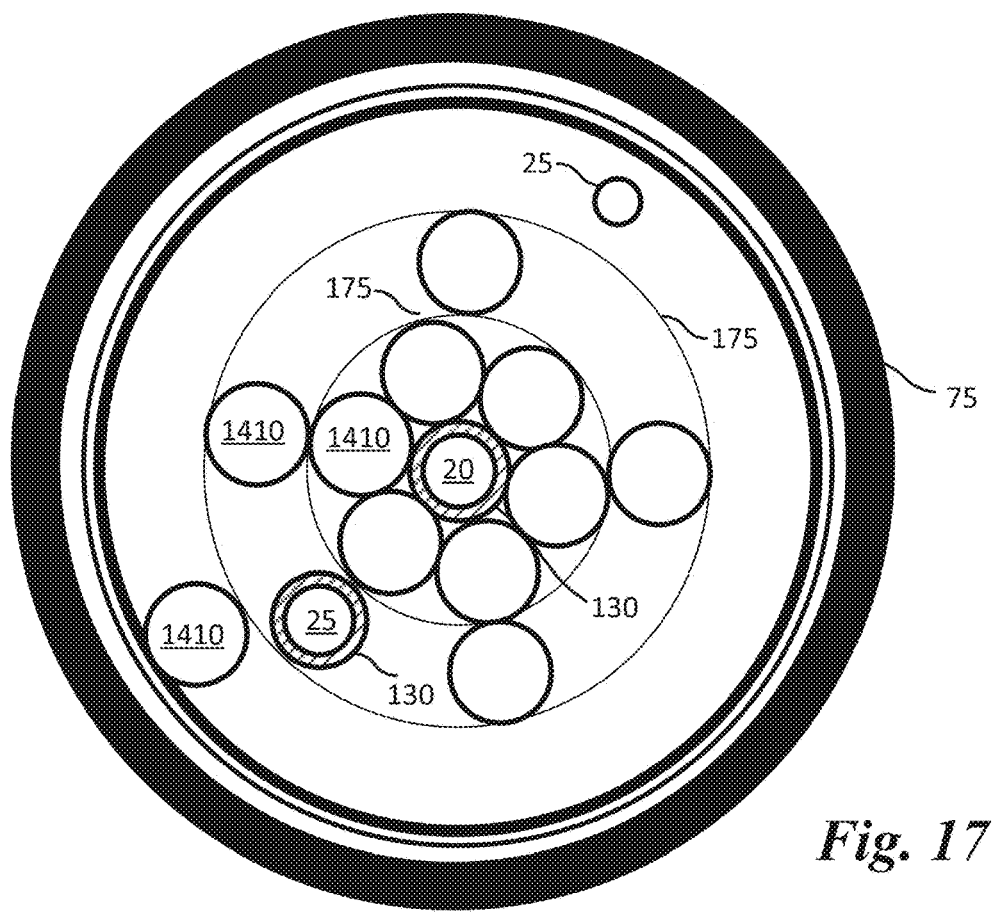
FIG. 17 illustrates a further generic embodiment including a plurality of deformable buffer tubes each formed using a single flexible ribbon and showing a combination of features described in various embodiments of the present invention.

As discussed above, any of the embodiment optical cables described herein may be implemented using deformable buffer tubes enclosing only a single flexible ribbon. FIGS. 15-17 specifically illustrate several optical cables comprising a plurality of deformable buffer tubes each enclosing a single flexible ribbon. Similarly labeled elements may be a previously described.

FIG. 15 illustrates a further embodiment of the present invention having an additional deformable upjacket surrounding the central strength member and including a plurality of deformable buffer tubes each formed using a single flexible ribbon. The optical cable of FIG. 15 may be a specific implementation of other embodiment optical cables, such as the optical cable of FIG. 4B, for example. Referring to FIG. 15, an optical cable includes a plurality of deformable buffer tubes 1410 each enclosing a single flexible ribbon. Although illustrated as having six deformable buffer tubes, any suitable number is possible.

FIG. 16 illustrates a still further embodiment of the present invention having an additional deformable upjacket surrounding the central strength member and including a plurality of deformable buffer tubes each formed using a single flexible ribbon. The optical cable of FIG. 16 may be a specific implementation of other embodiment optical cables, such as the optical cable of FIG. 4B, for example.

Referring to FIG. 16, an optical cable includes a plurality of deformable buffer tubes 1410 each enclosing a single flexible ribbon. Including a single flexible ribbon in each deformable buffer tube may advantageously allow one or more dimensions of the deformable buffer tubes 1410 to be reduced relative to other components of the optical cable, such as the central strength member 20, for example. Accordingly, the diameter of the optical cable may be further reduced.

Each deformable buffer tube 1410 may have a peripheral width W3, an interior width W4, and a physical contact distance d2 similar to the first width W1, second width W2, and distance d respectively as previously described. In contrast, the peripheral width W3 and the interior width W4 may be made relatively smaller while the number of deformable buffer tubes in the optical cable is increased. For example, as illustrated in FIG. 16, nine deformable buffer tubes are included in the optical cable, but larger or smaller numbers deformable buffer tubes that each enclose a single flexible ribbon are also possible.

The ratios of the physical contact distance d2 to the peripheral width W3 and the interior width W4 respectively may advantageously be increased relative to other embodiments due to the decreased size of each deformable buffer tube 1410 relative to the central strength member 20. In contrast to the peripheral width W3 and the interior width W4 which may decrease relative to the first width W1, second width W2, the physical contact distance d2 may be equal or greater than the distance d of other embodiments.

FIG. 17 illustrates a further generic embodiment including a plurality of deformable buffer tubes each formed using a single flexible ribbon and showing a combination of features described in various embodiments of the present invention. The optical cable of FIG. 17 may be a specific implementation of other embodiment optical cables, such as the optical cable of FIG. 12, for example. Specifically, the optical cable of FIG. 17 includes a multiple rows of deformable buffer tubes, each deformable buffer tube 1410 enclosing a single flexible ribbon. The subsequent cross-section view of the optical cable after undergoing deformation is not illustrated in FIG. 12. However, the individual buffer tubes are deformed as described in detail similar to the prior embodiments.

Example embodiments of the present invention are summarized here. Other embodiments can also be understood from the entirety of the specification and the claims filed herein.

Example 1

An optical cable includes a plurality of deformable buffer tubes. Each of the plurality of deformable buffer tubes includes a plurality of flexible ribbons, and each of the flexible ribbons includes a plurality of optical fibers. Each of the plurality of deformable buffer tubes has a non-circular cross-section. An outer jacket surrounds the plurality of deformable buffer tubes.

Example 2

The cable of example 1, where each of the plurality of deformable buffer tubes is configured to be deformed in any direction.

Example 3

The cable of one of examples 1 or 2, where the plurality of flexible ribbons is enclosed by a first deformable material that forms part of the outer surface of each of the plurality of buffer tubes.

Example 4

The cable of one of examples 1 to 3, where the first deformable material surrounding the plurality of flexible ribbons includes polypropylene, polyethylene, nylon, polyamide, polybutylene terephthalate, or a polyolefin copolymer included of polyethylene and polypropylene.

Example 5

The cable of one of examples 1 to 4, where the plurality of flexible ribbons is disposed within a gel material.

Example 6

The cable of one of examples 1 to 5, where each of the plurality of deformable buffer tubes includes a shape or dimension different from all the others of the plurality of deformable buffer tubes.

Example 7

The cable of one of examples 1 to 6, further includes a first rigid strength member disposed within the outer jacket.

Example 8

The cable of one of examples 1 to 7, where the rigid strength member is disposed in a central region surrounded by the plurality of deformable buffer tubes.

Example 9

The cable of one of examples 1 to 8, further includes a plurality of rigid additional strength members disposed between the plurality of deformable buffer tubes, where the plurality of additional rigid strength members is disposed around the first rigid strength member.

Example 10

The cable of one of examples 1 to 9, where the first rigid strength member is enclosed by a second deformable material.

Example 11

The cable of one of examples 1 to 10, where the second deformable material includes a material having a modulus less than 1 GPa at −40° C.

Example 12

The cable of one of examples 1 to 11, where the second deformable material includes a material having a modulus between 50 MPa and 600 MPa within a temperature range between −40° C. to 20° C.

Example 13

The cable of one of examples 1 to 12, where a compressive modulus of the second deformable material is less than a compressive modulus of a first deformable material surrounding the plurality of flexible ribbons.

Example 14

The cable of one of examples 1 to 3 and 5 to 13, where the first deformable material includes polypropylene and the second deformable material includes santoprene 201-87.

Example 15

An optical cable includes a central strength member and a plurality of buffer tubes disposed around the central strength member, where each of the plurality of buffer tubes includes a buffer tube jacket surrounding a plurality of flexible ribbons. The buffer tube jacket includes a first deformable material that is deformed plastically. Each of the flexible ribbons includes a plurality of optical fibers. An outer jacket surrounds the plurality of buffer tubes.

Example 16

The cable of example 15, where the plurality of buffer tubes are arranged in a plurality of concentric rows around the central strength member.

Example 17

The cable of one of examples 15 or 16, further includes additional strength member arranged in one of the plurality of concentric rows.

Example 18

The cable of one of examples 15 to 17, further includes a second deformable material surrounding the strength member.

Example 19

The cable of one of examples 15 to 18, further includes a second deformable material surrounding the additional strength member.

Example 20

The cable of one of examples 15 to 19, where the first deformable material includes polypropylene.

Example 21

The cable of one of examples 15 to 20, where a ratio of a thickness of the first deformable material to a cross-sectional width of one of the plurality of buffer tubes is about 0.1 to 1.

Example 22

An optical cable includes a rigid strength member and a deformable upjacket surrounds the rigid strength member. A plurality of buffer tubes is disposed around the rigid strength member. Each of the plurality of buffer tubes includes a plurality of ribbons, and each of the ribbons includes a plurality of optical fibers, where each of the plurality of buffer tubes includes a first compressive modulus, and the rigid strength member with the deformable upjacket includes a second compressive modulus. A ratio of the first modulus to the second modulus is about 1:1 to 1:20. An outer jacket surrounds the plurality of buffer tubes.

Example 23

The cable of example 22, where the deformable upjacket includes polypropylene based thermoplastic elastomer.

Example 24

The cable of one of examples 22 or 23, where the deformable upjacket includes a material having a modulus less than 1000 MPa at −40° C.

Example 25

The cable of one of examples 22 to 24, where the deformable upjacket includes a material having a modulus between 50 MPa and 600 MPa within a temperature range between −40° C. to 20° C.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical cable comprising:
   a central strength member rod comprising a strength member diameter;
   a plurality of buffer tubes disposed around the central strength member rod, each of the plurality of buffer tubes comprising a buffer tube jacket surrounding a single flexible ribbon, the buffer tube jacket comprising a first deformable material that has undergone permanent plastic deformation during formation of the optical cable to conform to an irregular axial cross-sectional shape of each respective single flexible ribbon,
   wherein each single flexible ribbon comprises a plurality of optical fibers and a first longitudinal length, and
   wherein, for each single flexible ribbon, each optical fiber of the plurality of optical fibers is attached to an adjacent optical fiber of the plurality of optical fibers along a bond region comprising a second longitudinal length that is less than the first longitudinal length;
   an outer jacket surrounding the plurality of buffer tubes; and
   wherein the strength member diameter is greater than an optical fiber diameter of each optical fiber of the optical cable.

2. The cable of claim 1, wherein the plurality of buffer tubes is arranged in a plurality of concentric rows around the central strength member rod.

3. The cable of claim 2, further comprising an additional strength member rod arranged in one of the plurality of concentric rows.

4. The cable of claim 2, further comprising a deformable upjacket surrounding the central strength member rod, the deformable upjacket comprising a second deformable material that is deformed plastically.

5. The cable of claim 4, wherein the second deformable material is a polypropylene based thermoplastic elastomer.

6. The cable of claim 4, wherein the first deformable material comprises polypropylene and the second deformable material comprises santoprene 201-87.

7. The cable of claim 1, wherein the first deformable material comprises polypropylene.

8. The cable of claim 1, wherein the second longitudinal length is less than 20% of the first longitudinal length.

9. The cable of claim 8, wherein the second longitudinal length is greater than a third longitudinal length separating successive bond regions.

10. The cable of claim 1, wherein:
each optical fiber of the plurality of optical fibers comprises a circumference; and
each bond region directly contacts less than 25% of each respective circumference of the corresponding optical fibers of the plurality of optical fibers.

11. The cable of claim 1, wherein the first deformable material comprises a polyolefin copolymer comprised of polyethylene and polypropylene.

12. The cable of claim 1, wherein the first deformable material comprises polybutylene terephthalate.

13. The cable of claim 1, further comprising a plurality of additional strength member rods disposed between the plurality of buffer tubes, wherein the plurality of additional strength member rods is disposed around the central strength member rod.

14. The cable of claim 1, wherein each single flexible ribbon is disposed within a gel material.

15. The cable of claim 1, wherein the central strength member rod is a metallic rod.

16. The cable of claim 1, wherein the central strength member rod is a glass reinforced polymer rod.

17. The cable of claim 1, wherein for each of the plurality of buffer tubes:
a ratio of a maximum thickness of the buffer tube jacket relative to a maximum cross-sectional width of the respective single flexible ribbon is about 0.001 to 0.01.

18. The cable of claim 1, wherein the strength member diameter is substantially similar to a cross-sectional width of each of the plurality of buffer tubes.

19. An optical cable comprising:
a central strength member rod comprising a strength member diameter;
a plurality of buffer tubes disposed around the central strength member rod, each of the plurality of buffer tubes comprising a buffer tube jacket surrounding a single flexible ribbon, the buffer tube jacket comprising a first deformable material that has undergone permanent plastic deformation during formation of the optical cable,
wherein each single flexible ribbon comprises a plurality of optical fibers and a first longitudinal length, and
wherein, for each single flexible ribbon, each optical fiber of the plurality of optical fibers is attached to an adjacent optical fiber of the plurality of optical fibers along a bond region comprising a second longitudinal length that is less than the first longitudinal length, the second longitudinal length being greater than a third longitudinal length separating successive bond regions;
an outer jacket surrounding the plurality of buffer tubes; and
wherein the strength member diameter is greater than an optical fiber diameter of each optical fiber of the optical cable.

20. The cable of claim 19, further comprising a deformable upjacket surrounding the central strength member rod, the deformable upjacket comprising a second deformable material that is deformed plastically.

21. The cable of claim 20, wherein the first deformable material comprises polypropylene and the second deformable material comprises santoprene 201-87.

22. An optical cable comprising:
a central strength member rod comprising a strength member diameter;
a plurality of buffer tubes disposed around the central strength member rod, each of the plurality of buffer tubes comprising a buffer tube jacket surrounding a single flexible ribbon, the buffer tube jacket comprising a first deformable material that has undergone permanent plastic deformation during formation of the optical cable to conform to an irregular axial cross-sectional shape of each respective single flexible ribbon,
wherein each single flexible ribbon comprises a plurality of optical fibers and a first longitudinal length, and
wherein, for each single flexible ribbon, each optical fiber of the plurality of optical fibers is attached to an adjacent optical fiber of the plurality of optical fibers along a bond region comprising a second longitudinal length that is less than the first longitudinal length;
an outer jacket surrounding the plurality of buffer tubes;
a deformable upjacket surrounding the central strength member rod, the deformable upjacket comprising a second deformable material that is deformed plastically;
wherein the strength member diameter is greater than an optical fiber diameter of each optical fiber of the optical cable;
wherein, for each buffer tube of the plurality of buffer tubes, the first deformable material of the buffer tube jacket physically contacts the outer jacket, the buffer tube jackets of adjacent buffer tubes, and the deformable upjacket; and
wherein, for each buffer tube of the plurality of buffer tubes, the buffer tube jacket comprising the first deformable material is deformed to deviate from a circular arc at all contact surfaces with the outer jacket, the respective adjacent buffer tubes, and the deformable upjacket to conform to the respective irregular axial cross-sectional shape.

23. The cable of claim 22, wherein the plurality of buffer tubes comprise a first buffer tube, a second buffer tube, and a third buffer tube, the first buffer tube comprising
a first portion of an outer surface of the first buffer tube that has undergone plastic deformation and is constrained by the outer jacket and having a first surface area,
a second portion of the outer surface that has undergone plastic deformation and is constrained by the second buffer tube and having a second surface area,
a third portion of the outer surface that has undergone plastic deformation and is constrained by the third buffer tube and having a third surface area, and
a fourth portion of the outer surface that has undergone plastic deformation and is constrained by the deformable upjacket and having a fourth surface area.

24. The cable of claim 23, wherein the first surface area of the first portion is greater than each of the second surface area of the second portion, the third surface area of the third portion, and the fourth surface area of the fourth portion.

25. The cable of claim 23, wherein the fourth surface of the fourth portion is greater than each of the second surface area of the second portion and the third surface area of the third portion.

26. The cable of claim 22, wherein the central strength member rod is a glass reinforced polymer rod.

27. The cable of claim 22, wherein the central strength member rod is an aramid reinforced composite rod.

28. The cable of claim 22, wherein the central strength member rod is a carbon fiber reinforced composite rod.

\* \* \* \* \*